(12) United States Patent
Oberle

(10) Patent No.: US 11,151,438 B2
(45) Date of Patent: Oct. 19, 2021

(54) RADIO-FREQUENCY IDENTIFICATION TAG

(71) Applicant: Vizinex LLC, Bethlehem, PA (US)

(72) Inventor: Robert Oberle, Emmaus, PA (US)

(73) Assignee: Vizinex LLC, Bethlehem, PA (US)

( * ) Notice: Subject to any disclaimer, the term of this patent is extended or adjusted under 35 U.S.C. 154(b) by 0 days.

(21) Appl. No.: 16/937,921

(22) Filed: Jul. 24, 2020

(65) Prior Publication Data

US 2021/0027131 A1 Jan. 28, 2021

Related U.S. Application Data

(60) Provisional application No. 62/878,690, filed on Jul. 25, 2019.

(51) Int. Cl.
*G06K 19/077* (2006.01)
*G06K 19/07* (2006.01)

(52) U.S. Cl.
CPC ... *G06K 19/07783* (2013.01); *G06K 19/0723* (2013.01); *G06K 19/0772* (2013.01)

(58) Field of Classification Search
CPC ........ G06K 19/00; G06K 19/04; G06K 19/06; G06K 19/067; G06K 19/07
USPC ................................ 235/492, 380, 375, 487
See application file for complete search history.

(56) References Cited

U.S. PATENT DOCUMENTS

| 6,268,796 | B1 | 7/2001 | Gnadinger et al. |
| 7,432,816 | B1 | 10/2008 | Ku et al. |
| 10,366,318 | B2 | 7/2019 | Blank |
| 10,706,345 | B2 | 7/2020 | Blank |
| 2008/0062044 | A1 | 3/2008 | Al-Mandawi |
| 2008/0143480 | A1* | 6/2008 | Egbert ................ H04B 5/0062 340/10.1 |
| 2010/0079286 | A1 | 4/2010 | Phaneuf |
| 2010/0201487 | A1 | 8/2010 | Halberthal et al. |
| 2014/0062825 | A1 | 3/2014 | Hansen |

(Continued)

*Primary Examiner* — Edwyn Labaze
(74) *Attorney, Agent, or Firm* — Michael J. Nickerson; Basch & Nickerson LLP

(57) ABSTRACT

A micro radio frequency identification tag for use on an article, the micro radio frequency identification tag comprises a substrate having a first surface and a second surface, each surface including a width and a longitudinal length, the longitudinal length being greater than the width; a chip anchor having a first chip attachment pad and a second chip attachment pad; a radio frequency identification chip operatively retained on the first surface by the chip anchor; a component anchor having a first component attachment pad and a second component attachment pad; a passive component operatively retained on the first surface by the component anchor; a continuous planar antenna operatively retained on the second surface; a first conductive trace interconnect segment connected to the continuous planar antenna and the first chip attachment pad; a second conductive trace interconnect segment connected to the continuous planar antenna and the second chip attachment pad; a third conductive trace interconnect segment connected to the continuous planar antenna and the first component attachment pad; a fourth conductive trace interconnect segment connected to the continuous planar antenna and the second component attachment pad.

20 Claims, 18 Drawing Sheets

(56) References Cited

U.S. PATENT DOCUMENTS

| | | |
|---|---|---|
| 2014/0209691 A1 | 7/2014 | Finn et al. |
| 2014/0320376 A1 | 10/2014 | Ozdemir |
| 2015/0091725 A1 | 4/2015 | Rigsby et al. |
| 2015/0272690 A1 | 10/2015 | Deng et al. |
| 2015/0294215 A1* | 10/2015 | Manzi .................. G06K 7/0008 235/439 |
| 2016/0346045 A1 | 12/2016 | Sterret et al. |
| 2017/0185884 A1 | 6/2017 | Lynch et al. |

* cited by examiner

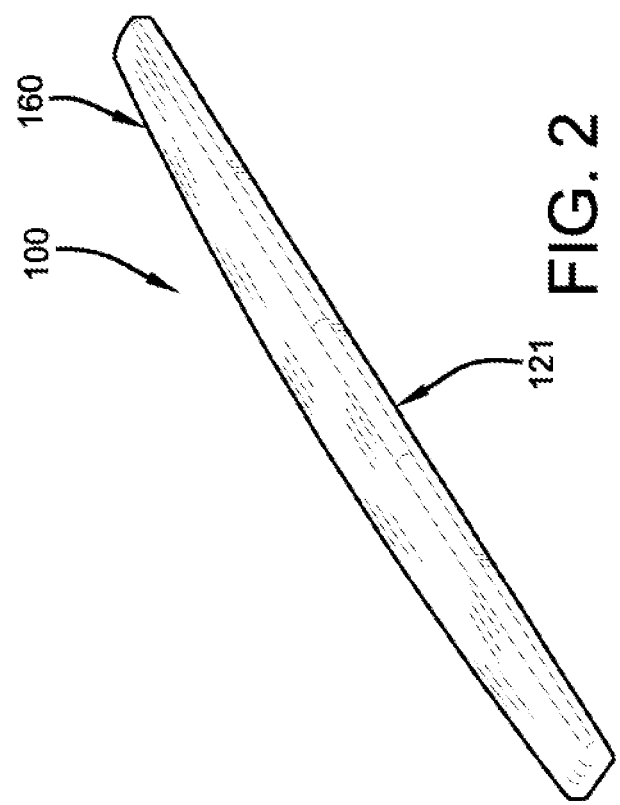
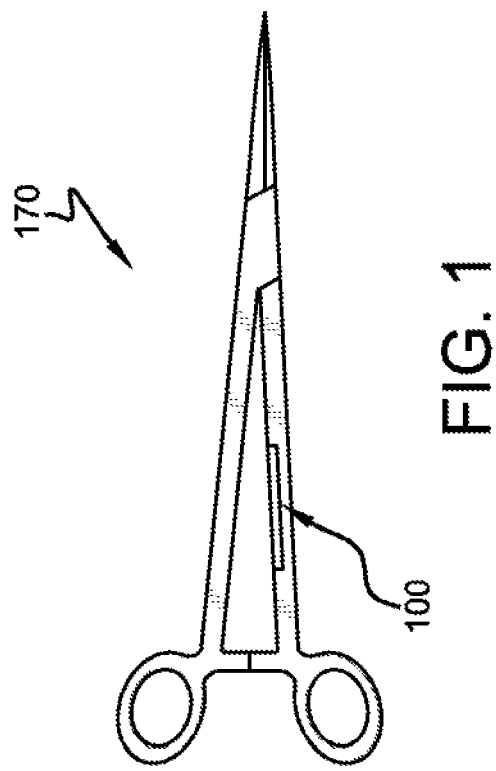
FIG. 1
FIG. 2

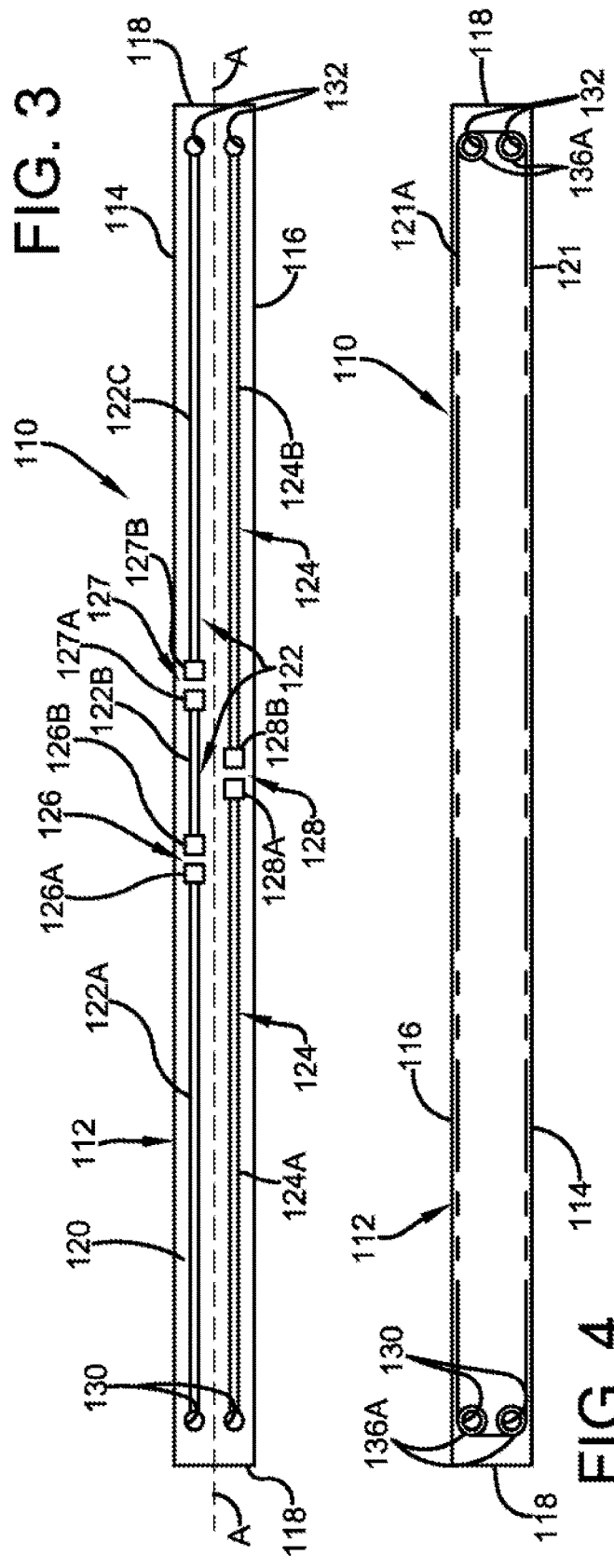
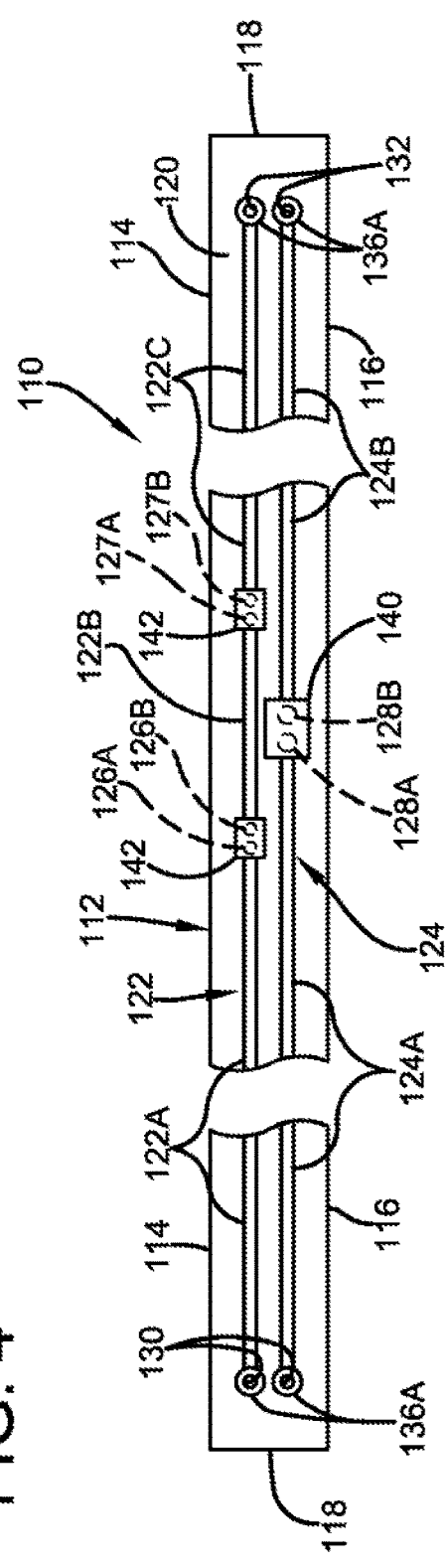

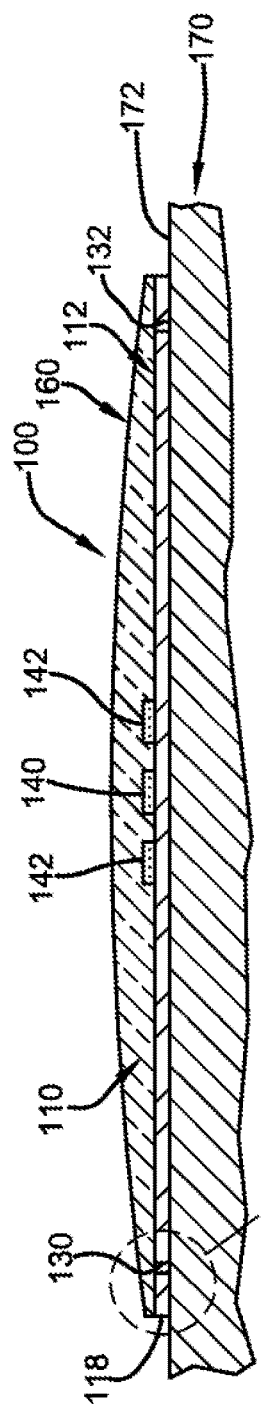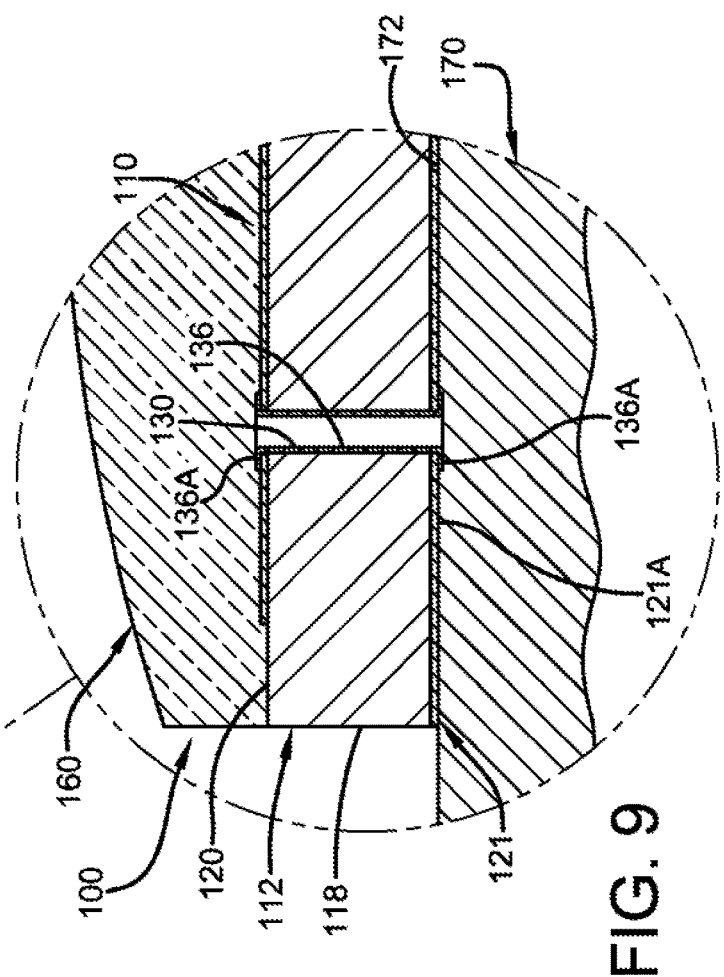

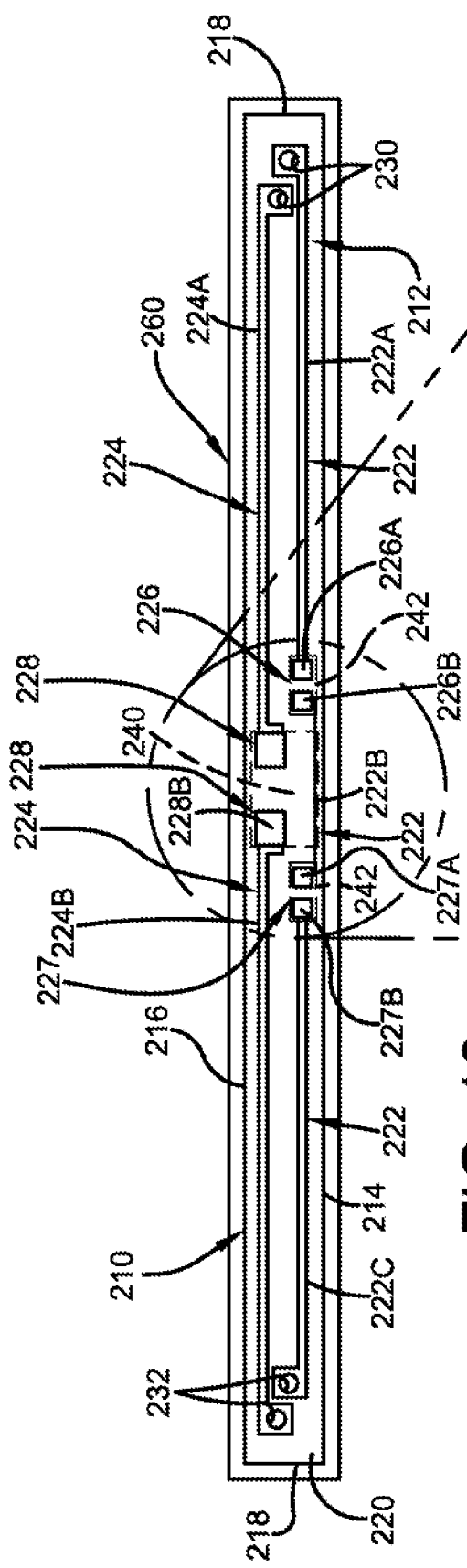
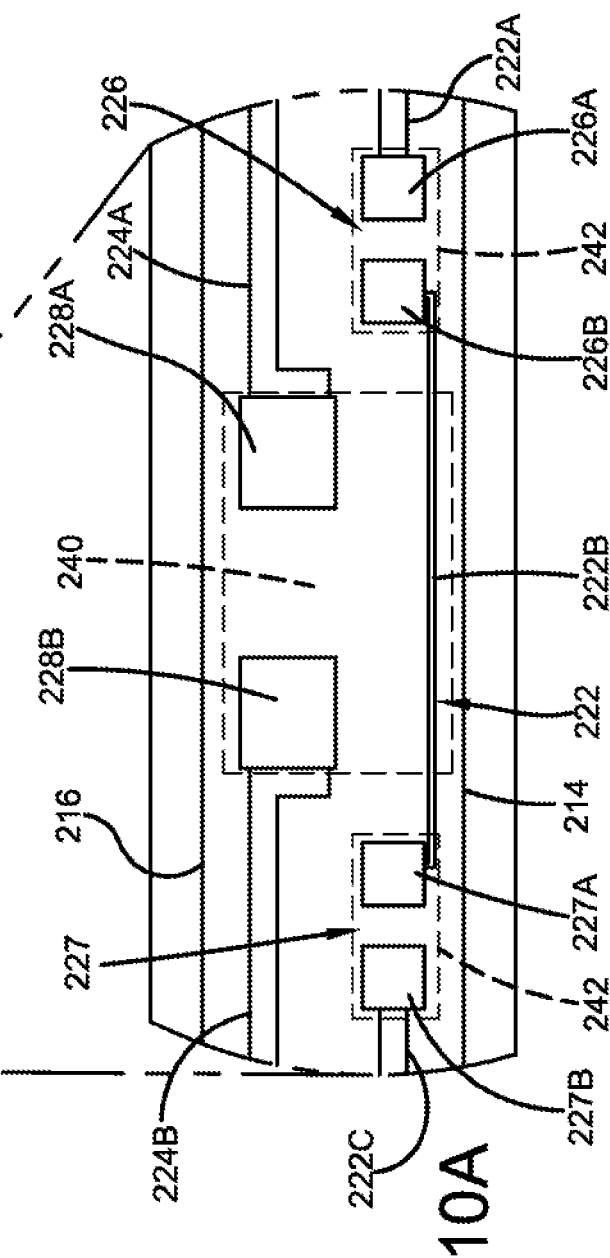
FIG. 10
FIG. 10A

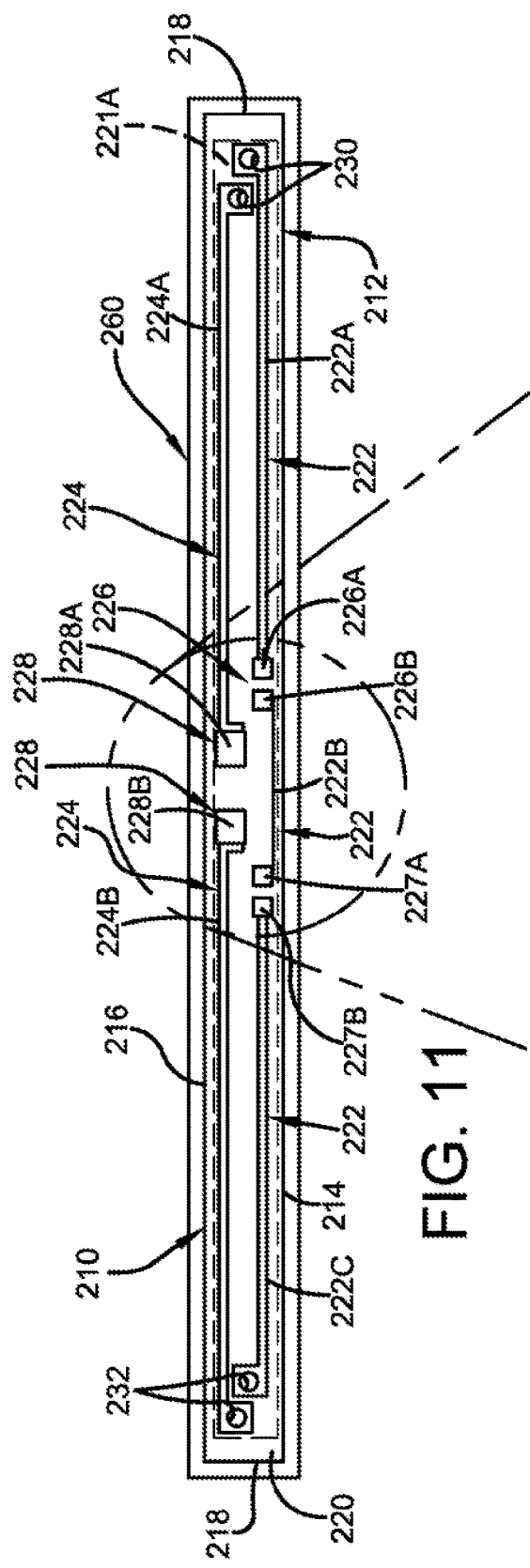
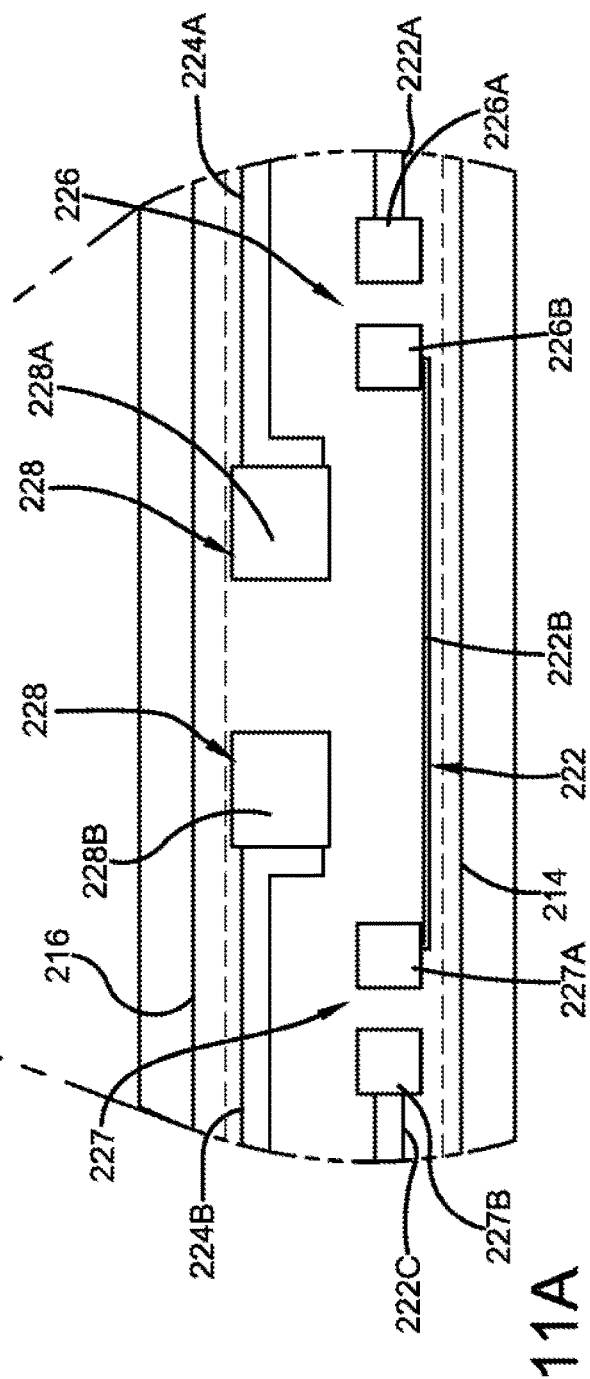
FIG. 11
FIG. 11A

RADIO-FREQUENCY IDENTIFICATION TAG

PRIORITY INFORMATION

The present application claims priority, under 35 U.S.C. § 119(e), from U.S. Provisional patent application, Ser. No. 62/878,690, filed on Jul. 25, 2019. The entire content of U.S. Provisional patent application, Ser. No. 62/878,690, filed on Jul. 25, 2019, is hereby incorporated by reference.

BACKGROUND

Identification and tracking of articles and other equipment is generally well known. In particular, identification and tracking of articles, such as industrial equipment and tools or surgical instruments, has been utilized to ensure proper maintenance and use-life schedule as well as to monitor the physical location of the articles. Typically, the process of identification and tracking is accomplished through manual record keeping, visual inspection, and processing of the articles or instruments. More particularly, identification of the articles is typically provided through visual marking, such as mechanical etching or color-coded films or bands, which allow for non-specific identification of the article. However, because the articles may be grouped together indiscriminately for processing, identification and tracking, using visual markings lacks specificity and requires an increased amount of time for workers to accomplish.

In order to increase the specificity and speed of identification and tracking, electronic identification technology has been developed to provide unique tracking of certain articles. In particular, radio frequency identification systems have been adapted for identification and tracking of various assets and articles and are generally well known. Radio frequency identification systems typically use reusable radio frequency identification tags mounted on, or embedded in, an article to be tracked. These mounted radio frequency identification tags allow for tracking of the article through gathering processes, use, and maintenance.

Conventional radio frequency identification tags are generally formed on a substrate and include an integrated circuit with memory and logic components. Conventional radio frequency identification tags may also include other components, such as a power sources, transistors, diodes, and transmission mechanisms. Typically, the memory component interacts with the logic component, allowing the storage of data, typically identification information, such as an identification number, that corresponds to the article on which the radio frequency identification tag is mounted. The memory component may also allow new or additional information to be stored or, together with the logic component, may allow the radio frequency identification tag to manipulate data or perform additional functions.

Other components, such as a capacitor or power source provide electrical energy for the logic and memory components to operate. Other components, such as transmission mechanisms or antennas, allow data to be transmitted between the radio frequency identification tag and a radio frequency reader or field generator. The memory, logic, and other components are typically formed in or mounted on the substrate. The assembled radio frequency identification tag including the memory, logic, and other components may then be encapsulated in some material for protection.

Conventional radio frequency identification tags typically operate by either active or passive means. Active radio frequency identification tags generally have a discrete power source, such as a battery. The battery is activated, or turned on, by an external means, such as a radio frequency field produced by an radio frequency reader or field generator, allowing the battery to power the logic and memory components. Passive radio frequency identification tags are typically inductively or capacitively energized and activated by external means. In particular, passive radio frequency identification tags require energization by an radio frequency field. Inductive radio frequency identification tags typically have a metal wire wound into a coil acting as an antenna.

The antenna creates an induction charge in the presence of the electromagnetic energy of the radio frequency field. The induction charge, in turn, powers the logic and memory components. Capacitive radio frequency identification tags have a conductive ink applied to a silicon substrate acting as an antenna. The conductive ink on the silicon substrate has a similar effect as in an inductive radio frequency identification tag when exposed to an electromagnetic wave generated by the radio frequency reader or field generator. When exposed to an radio frequency field, both active and passive radio frequency identification tags are activated and modulate the radio frequency field to transmit data back to the radio frequency reader. In particular, the logic component executes all data functions, such as retrieving stored data from the memory component and transmitting the retrieved data.

Thus, conventional radio frequency identification tags provide a means of remotely accessing and retrieving information encoded therein relevant to the articles to be tracked for effective identification, monitoring, and control of the article through industrial processes, use, and maintenance.

Conventional radio frequency identification tags, while satisfactory for their intended functions, have disadvantages, drawbacks, and limitations. For example, the read range, or the distance from which a conventional passive radio frequency identification tag can be read, is relatively low, requiring an radio frequency reader to be in close proximity to the radio frequency identification tag in order to retrieve the data. This reduces the efficiency and speed with which a large number of articles fitted with radio frequency identification tags can be identified and tracked through typical industrial and/or medical processes and use.

Moreover, conventional radio frequency identification tags must also be smaller and shaped to compliment the contour of the article in order to prevent interference with use of the article to which the radio frequency identification tag is mounted. Smaller conventional radio frequency identification tags have shorter antennae lengths, resulting in a lower transmitted signal gain, which reduces the read range of the conventional radio frequency identification tags.

As a result, conventional radio frequency identification tags are only readable at very close distances, usually in the range of from about 6 in. (152.4 mm) to 12 in (304.8 mm). To extend the read range, conventional radio frequency identification tags often have increased antenna lengths. However, increasing antenna length undesirably increases the overall size and adversely changes the shape of the conventional radio frequency identification tag.

Alternatively, conventional radio frequency identification tags may increase the available charge to the logic component. This, in turn, may increase the transmission signal output power, thereby increasing the read range. However, increasing the available charge in conventional radio frequency identification tags generally requires additional components, such as a supplementary power supply or batteries, which increase the size and weight of the conventional radio frequency identification tags.

Mounting of such large conventional radio frequency identification tags to delicate articles may be difficult and/or require placement of the radio frequency identification tag on the article in a manner that causes the radio frequency identification tag to obstruct or interfere with the normal operation of the article or predisposes the radio frequency identification tag to damage or incidental removal during industrial processes, use, sterilization, or maintenance.

To overcome the disadvantages, drawbacks, and limitations of conventional radio frequency identification tags, a micro radio frequency identification tag is provided with a conductive surface that contacts the surface of an article to which the micro radio frequency identification tag is mounted.

More specifically, the micro radio frequency identification tag has a substrate with an antenna acting as a conductive surface, which is in contact with the surface of the article to which the micro radio frequency identification tag is mounted. The antenna acting as a conductive surface effectively extends the operating length of the antenna of the micro radio frequency identification tag, which increases the read range. It is not necessary that the antenna exhibit an Ohmic, continuity at DC, connection to the article.

In addition, the micro radio frequency identification tag includes capacitor(s) operatively connected to the antenna and logic circuitry to provide greater charge to the antenna and the logic means, increasing output power and read range of the micro radio frequency identification tag.

An encapsulation layer, disposed around at least a portion of the micro radio frequency identification tag, provides the micro radio frequency identification tag with protection from chemicals, impacts, and extreme temperatures. As a result, the overall size and weight of the micro radio frequency identification tag is elongated and relatively small in width and height, allowing for increased read range and easier mounting on the article without obstructing the normal operation of the article.

BRIEF DESCRIPTION OF THE DRAWINGS

The drawings are only for purposes of illustrating various embodiments and are not to be construed as limiting, wherein:

FIG. 1 is a top view of an article having a first exemplary embodiment micro radio frequency identification tag mounted thereon;

FIG. 2 is a perspective view of a micro radio frequency identification tag;

FIG. 3 is a top plan view of a substrate assembly of the micro radio frequency identification tag of FIG. 2, prior to being mounted with the integrated components;

FIG. 4 is a bottom plan view of the substrate assembly, shown in FIG. 3, showing a conductive layer and communication bores;

FIG. 5 is an enlarged fragmentary top plan view of portions of the substrate assembly, shown in FIG. 3, with the integrated components attached;

FIG. 8 is a cross-sectional view of the first exemplary embodiment micro radio frequency identification tag, mounted on the article;

FIG. 9 is an enlarged cross-sectional view of a portion of the first exemplary embodiment micro radio frequency identification tag, shown in FIG. 8, showing a conductive bridge through a bore between the substrate surfaces for contact between the substrate assembly and the article;

FIG. 10 is a top plan view of a second exemplary embodiment of an elongated micro radio frequency identification tag;

FIG. 10A is a greatly enlarged view of a portion of the second exemplary embodiment micro radio frequency identification tag, shown in FIG. 10, showing the trace interconnect segments situated generally below the radio frequency identification assembly;

FIG. 11 is a top plan view of the second exemplary embodiment micro-radio frequency identification tag shown in FIG. 10, showing the radio frequency identification assembly and capacitors removed;

FIG. 11A is a greatly enlarged view of a portion of the second exemplary embodiment micro radio frequency identification tag, shown in FIG. 11;

DESCRIPTION OF THE DRAWINGS

Figure 2A:
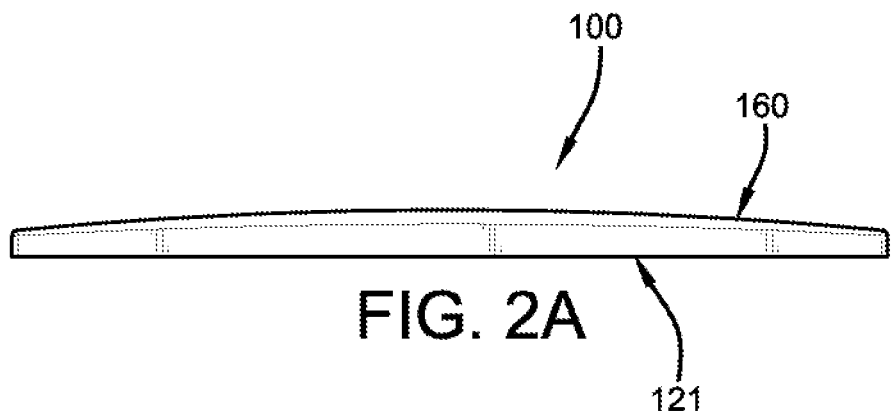
FIG. 2A is a side elevational view of the first exemplary embodiment micro radio frequency identification tag.
Figure 2B:
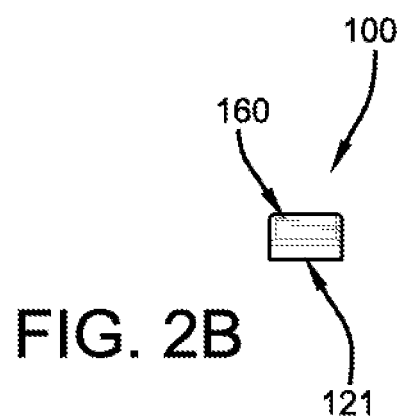
FIG. 2B is an end elevational view of the first exemplary embodiment micro radio frequency identification tag.
Figure 2C:
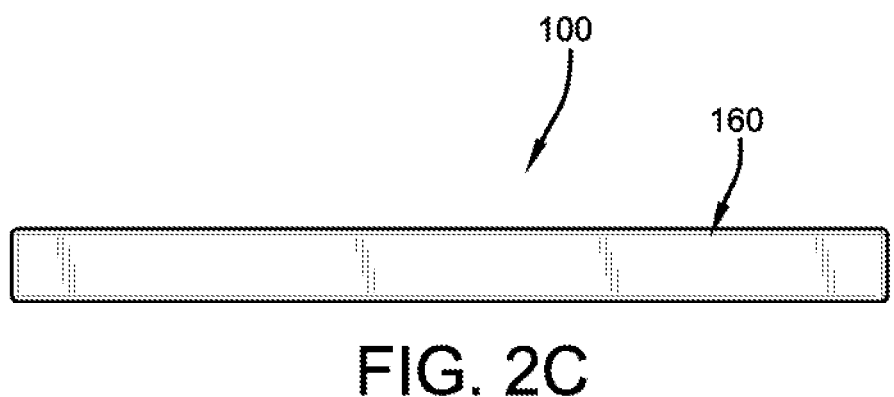
FIG. 2C is a top plan view of the first exemplary embodiment micro radio frequency identification tag.

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts could be properly illustrated.

As disclosed in U.S. Pat. No. 10,366,318, an article 170, such as a surgical instrument, is illustrated in FIG. 1 with a first exemplary embodiment micro radio frequency identification tag 100, mounted thereon. The entire content of U.S. Pat. No. 10,366,318 is hereby incorporated by reference. First exemplary embodiment micro radio frequency identification tag 100 includes a substrate assembly 110 and an encapsulation layer 160, as illustrated in FIG. 2A, partially or wholly surrounding the substrate assembly 110.

The substrate assembly 110 has a non-conductive support substrate formed from any suitable material, such as fiberglass or other glass epoxy, as is known. The substrate is a single-layer construction and may have a flat printed circuit board configuration with a longitudinal central axis.

Alternatively, the substrate may have a multi-layer construction formed from a suitable process, such that substrate may have multiple integrated circuits and interconnections spanning multiple layers. The substrate generally includes an upper surface; elongated, parallel, spaced-apart opposing side edges; opposing ends; and a flat bottom or engagement surface.

The engagement surface operatively retains a conductive coating or antenna over at least a portion of the engagement surface. The antenna is formed by any suitable process from any suitable material, such as metallic foil or conductive ink. The upper surface generally includes a pair of conductive trace interconnects, anchors, and communication bores.

With reference to FIGS. 3-5, as disclosed in U.S. Pat. No. 10,366,318, anchors 126, 127, and 128 include individual component solder attachment pads 126A and 126B; 127A and 127B; and 128A and 128B, respectively. Each of the attachment pads 126A, 126B, 127A, 127B, 128A, and 128B may be formed using any suitable process from any suitable material, such as metallic foil or conductive ink, as is known, which allows for the use of solder material to attach components to the attachment pads.

Anchors 126, 127, and 128 may be arranged on upper surface 120 in any suitable manner allowing for the attachment or mounting of any suitable components. More preferably, anchors 126 and 127 are spaced apart and operatively retained on upper surface 120 along conductive trace interconnect 122 between longitudinal central axis A and edge 114. Anchor 128 is operatively retained on upper surface 120 along conductive trace interconnect 124 between longitudinal central axis A and edge 116.

Anchor 128 is generally symmetrically aligned and equidistant from anchors 126 and 127. Anchor 128 may have a radio frequency identification assembly or encoded chip 140 attached by any suitable means to provide electrical conduction between the attachment point and the radio frequency identification encoded chip.

Radio frequency identification encoded chip 140 may be of any suitable size and include an integrated or discrete memory means or device, such as flash memory, to store data, such as a unique identification number, as is known. Radio frequency identification encoded chip 140 may also include an integrated transmitter for broadcasting the data stored in any integrated or discrete memory means or device, as is known. As a result, radio frequency identification encoded chip 140 may overlie portions of trace interconnects 122, 124 without contacting the interconnects.

Anchors 126 and 127 may have dedicated antenna-enabled capacitors 142 similarly attached by any suitable electrically conductive means. Alternatively, other components, such as discrete memory means or devices, separate power sources, and the like, may be attached to any number of other anchors on either upper surface 120 or engagement surface 121. It should be understood that radio frequency identification encoded chip 140 could be an SMT Packaged Chip, without changing the overall concept or operation.

Trace interconnects 122 and 124 are generally formed using any suitable process from any suitable material, such as metallic foil, conductive ink, wire, or the like, and extend in spaced parallel relation to one another. Trace interconnect 122 is formed from one or more segments 122A, 122B, and 122C, preferably in symmetric spaced relationship with anchor 128, trace interconnect 124, and bores 130 and 132. Similarly, trace interconnect 124 is formed from a pair of segments 124A and 124B.

Trace interconnect segments 122A and 122C overlie and extend from communication bores 130 and 132, respectively, and terminate into attachment pads 126A and 127B, respectively, of anchors 126 and 127. Trace interconnect segment 122B extends between and terminates into attachment pads 126B and 127A. As a result, trace interconnect 122 is operatively connected to and bridges between capacitors 142. Trace interconnect segments 124A and 124B overlie and extend from communication bores 130 and 132, respectively, and terminate into attachment pads 128A and 128B, respectively, of anchor 128. As a result, trace interconnect 124 is operatively connected to radio frequency identification encoded chip 140.

Communication bores 130 and 132 are each arranged proximate to a respective opposite end 118 of substrate 112. Communication bores 130 and 132 may each form a pair of openings on upper surface 120 and extend through substrate 112 to engagement surface 121. Alternatively, communication bores 130 and 132 may form any number of openings or other conductive means, such as wires, a rivet, a plated opening or opening filled with conductive ink, or the like, which may extend partially or completely through substrate 112. Conductive communication sleeves 136 line or extend through each of communication bore 130 and 132.

Sleeves 136 may be formed using any suitable process from any suitable material, such as metallic foil, wire, plating, conductive fill, rivets, or the like, and include radially-outwardly extending flanges or engagement lips 136A at opposite ends of the sleeves. Engagement lips 136A of each sleeve 136 operatively contact or engage trace interconnects 122 and 124 and antenna 121A.

More particularly, sleeves 136 provide a conductive communication bridge from trace interconnect 122 to antenna 121A and to trace interconnect 124, creating a conductive bridge between radio frequency identification encoded chip 140, capacitors 142, and antenna 121A. Preferably, the structural components are arranged with symmetrical balance.

As a result, capacitors 142 provide an increased and uniformly balanced charge to radio frequency identification encoded chip 140, increasing the output power of the transmitter of the radio frequency identification encoded chip, thereby increasing the read range of micro radio frequency identification tag 100

Figure 6:
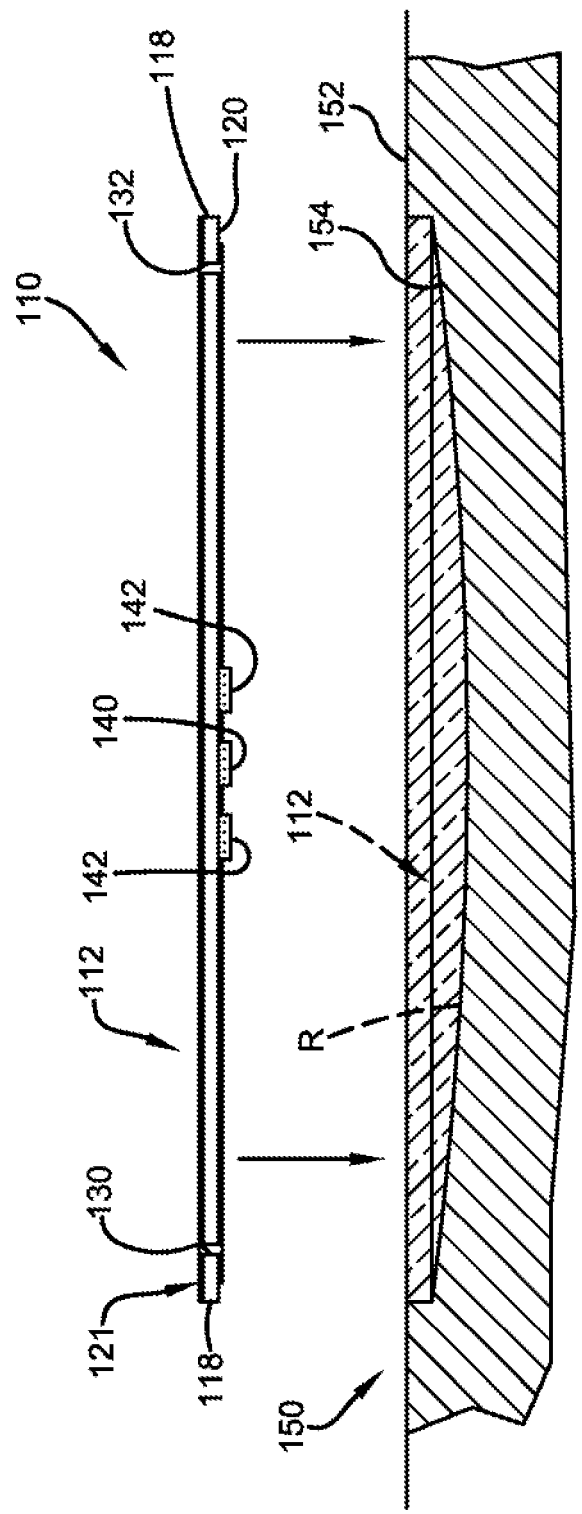
FIG. 6 is an elevational view in section of the substrate assembly of the first exemplary embodiment micro radio frequency identification tag, positioned for insertion into an encapsulation process mold.
Figure 7:
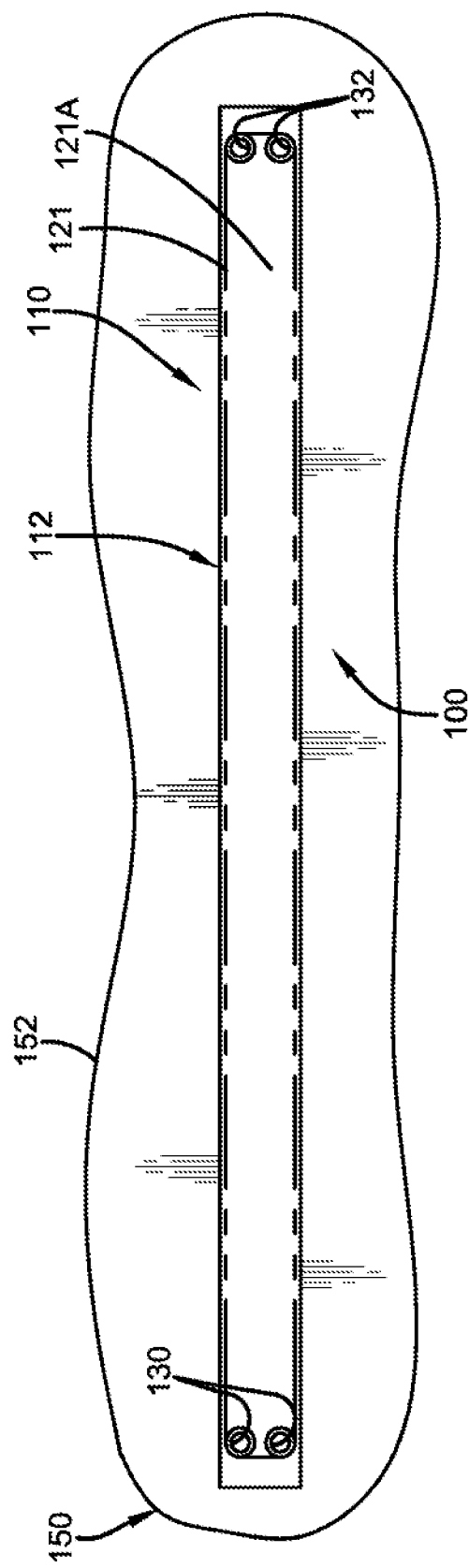
FIG. 7 is a bottom plan view of the substrate assembly, shown in FIG. 6, disposed within the encapsulation process mold.

Turning now to FIGS. 6-7, as disclosed in U.S. Pat. No. 10,366,318, encapsulation layer 160 may be formed by any suitable method or technique using any suitable material capable of withstanding extreme temperature and pressure. In particular, encapsulation layer 160 may be formed using a material molding process. A mold 150 has an upper surface 152. Upper surface 152 has a contoured, elongated recess or receiving channel 154 adapted to be filled with an encapsulation material R, such as an epoxy, for example EpoxAcast™ 670 HT (Smooth-On, Inc.), or other suitable resin.

Encapsulation material R may include specialized components or additives that provide or enhance specific physical or mechanical properties of the material. In particular, encapsulation material R may include an additive to increase the flexibility of the cured material, such as Flexer™ Epoxy Flexibilizer (Smooth-On, Inc.). As a result, once cured, encapsulation material R may have reduced hardness, providing flexibility to conform to article 170 and preventing damage to encapsulation layer 160 or substrate assembly 110 from impacts.

Encapsulation material R, once cured may have a Shore hardness in the range of from about 45 D to about 110 D, and more preferably from about 70 D to about 85 D. In addition, encapsulation material R, when cured, may be capable of withstanding extreme temperatures, such as those that first exemplary embodiment micro radio frequency identification tag 100 may be exposed to in industrial and/or medical processes, use, and maintenance. Encapsulation material R may be capable of withstanding temperatures in the range of from about −58° F. to about 425° F. More preferably, encapsulation material R may have a high temperature tolerance above 302° F., or the temperature commonly used in sterilization or cleaning processes, such as autoclaving.

Substrate assembly 110 may be inverted and disposed within encapsulation material R to submerge all or a portion of the substrate assembly 110, including upper surface 120; edges 114, 116; and ends 118. Once encapsulation material R is cured or set, the first exemplary embodiment micro radio frequency identification tag 100 may be removed from mold 150 and mounted on article 170 for use.

Alternatively, encapsulation layer 160 may be formed about substrate assembly 110 using an injection molding process. Generally, a plurality of substrate assemblies 110 may be placed in an appropriately shaped block or mold (not shown). The block may then have any suitable injectable polymer or material, such as Grilamid (EMS-Grivory), pushed into the block or mold. The injectable material may have slightly different properties from encapsulation material R described above.

In particular, the injectable material may have a greater preferred Shore hardness in the range of from about 65 D to about 85 D. The injectable material is allowed to cool and the block is opened to release the encapsulated first exemplary embodiment micro radio frequency identification tag 100, which may then be mounted on an article 170 for use.

The antenna 121A on engagement surface 121 also acts as a conductive layer to provide electrically conductive communication between substrate assembly 110 and article 170, as shown in FIGS. 8-9 and disclosed in U.S. Pat. No. 10,366,318. In particular, micro radio frequency identification tag 100 is generally fixedly mounted on article 170 in order to identify and track the article through various industrial and/or medical processes, use, and maintenance.

One embodiment of the micro radio frequency identification tag 100 is mounted on article 170 using any suitable mechanical or chemical methods and materials, such as conductive adhesive, capable of ensuring a strong bond resistant to extreme conditions and chemical exposure as well as providing conductive communication between the article and antenna 121A.

Upon mounting of first exemplary embodiment micro radio frequency identification tag 100, engagement surface 121 of substrate 112 contacts article 170 or may be separated by a thin layer of adhesive, encapsulation material R, or the like. More particularly, antenna 121A may be in intimate contact with metallic surface 172 of article 170.

As a result, a conductive bridge is formed between capacitors 142, radio frequency identification encoded chip 140, interconnects 122 and 124, and article 170. The resulting conductive bridge effectively extends the length of the antenna 121A, allowing first exemplary embodiment micro radio frequency identification tag 100 to have increased signal gain, thereby increasing the read range of the micro radio frequency identification tag.

Thus, the embodiment of the micro radio frequency identification tag 100 provides substrate assembly 110 with capacitors 142 and trace interconnects 122 and 124 to increase power output of radio frequency identification encoded chip 140, extends the effective length of antenna 121A by providing an interface with the conductive article and provides protection from impacts, chemicals, and extreme temperatures via encapsulation layer 160.

As a result, the overall elongated shape, size, and weight of the micro radio frequency identification tag 100 is optimized and reduced or maintained, yet allows for increased read range and easier mounting on article 170 without obstructing the normal operation of the article.

Turning now to FIGS. 10A, 10B, 11A, and 11B, as disclosed in U.S. Pat. No. 10,366,318, an embodiment of the micro radio frequency identification tag 200 is shown. The embodiment of the micro radio frequency identification tag 200 is similar to the micro radio frequency identification tag 100 in construction and arrangement. As a result, the description below will be primarily directed to the differences between the micro radio frequency identification tag 100 and the micro radio frequency identification tag 200.

The micro radio frequency identification tag 200 includes a substrate assembly 210 and an encapsulation layer 260 partially or wholly surrounding the substrate assembly. Substrate assembly 210 has a non-conductive support substrate 212 formed as a single layer construction including an upper surface 220; elongated, parallel, spaced-apart opposing side edges 214 and 216; opposing ends 218; a flat bottom or engagement surface (not shown), and a longitudinal central axis A'.

The engagement surface operatively retains a conductive coating or antenna 221A over at least a portion of the engagement surface. Upper surface 220 generally includes a pair of conductive trace interconnects 222 and 224, anchors 226, 227 and 228, and communication bores 230 and 232.

Anchors 226, 227 and 228 include individual component solder attachment pads 226A, 226B, 227A, 227B, 228A and 228B, respectively. Anchors 226, 227 and 228 may be arranged on upper surface 220 in any suitable manner allowing for the attachment or mounting of any suitable components. More preferably, anchors 226 and 227 are spaced apart and operatively retained on upper surface 220 between longitudinal central axis A' and edge 214.

Anchor 228 is operatively retained on upper surface 220 partially overlaying longitudinal central axis A' adjacent edge 216. Anchors 226 and 227 are equidistant from anchor 228, in symmetric spaced relationship with anchor 228, trace interconnect 224, and bores 230 and 232. Anchor 228 may have a radio frequency identification assembly or encoded chip 240 attached by any suitable means to provide electrical conduction between the attachment point and the radio frequency identification assembly.

Radio frequency identification assembly 240 may be of any suitable size and include an integrated or discrete memory means or device, such as flash memory, to store data, such as a unique identification number, as is known. Radio frequency identification assembly 240 may also include an integrated transmitter for broadcasting the data stored in any integrated or discrete memory means or device. Radio frequency identification assembly 240 generally extends over longitudinal central axis A' and is adjacent to edge 214 and edge 216, nearly occupying the entire width of substrate 212.

Anchors 226 and 227 may have dedicated antenna-enabled capacitors 242 similarly attached by any suitable electrically conductive means and disposed in a manner preventing contact with radio frequency identification assembly 240. Alternatively, other components, such as discrete memory means or devices, separate power sources, and the like, may be attached to any number of other anchors on either upper surface 220 or the engagement surface (not shown).

Trace interconnects 222 and 224 are generally formed from an appropriate material, such as metallic foil, conductive ink, or wire, and extend in spaced parallel relation to one another. Trace interconnect 222 is formed from one or more segments 222A, 222B and 222C. Similarly, trace interconnect 224 is formed from a pair of segments 224A and 224B.

Trace interconnect segments 222A and 222C overlie and extend from communication bores 230 and 232, respectively, and terminate into attachment pads 226A and 227B, respectively, of anchors 226 and 227. Trace interconnect segment 222B extends between and terminates into attachment pads 226B and 227A.

More particularly, trace interconnect segment 222B may be partially or wholly retained on edge 214 to prevent radio frequency identification assembly 240 from contacting the segment. As a result, trace interconnect 222 is operatively connected to and bridges between capacitors 242. Trace interconnect segments 224A and 224B overlie and extend from communication bores 230 and 232, respectively, and terminate into attachment pads 228A and 228B, respectively, of anchor 228. As a result, trace interconnect 224 is operatively connected to radio frequency identification assembly 240.

Thus, the micro radio frequency identification tag 200 provides substrate assembly 210 with capacitors 242 and interconnects 222 and 224 to increase power output of radio frequency identification assembly 240, extends the effective length of antenna 221A by providing an interface with the conductive article, and provides protection from impacts, chemicals, and extreme temperatures via encapsulation layer 260.

As a result, the overall elongated shape, size, and weight of the micro radio frequency identification tag 200 is optimized and reduced or maintained, allowing for increased read range and easier mounting on an article (not shown) without obstructing the normal operation of the article.

Figure 12:
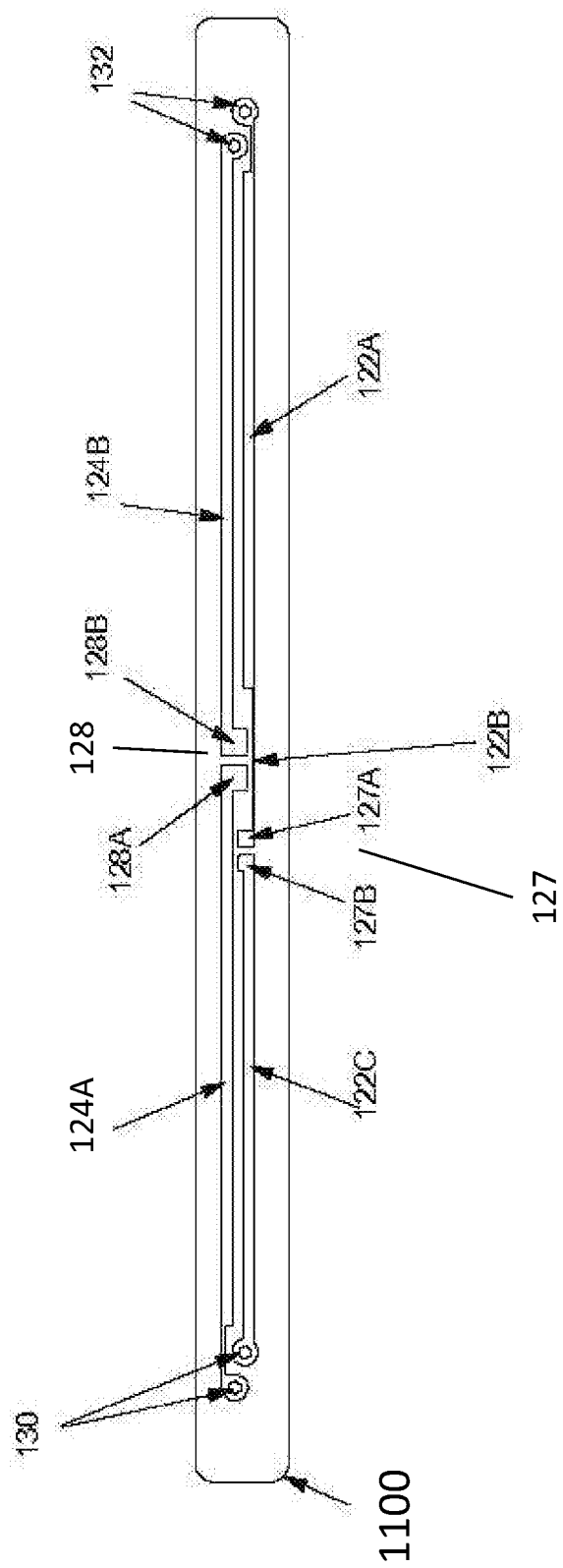
FIG. 12 illustrates a substrate assembly of another embodiment of a micro radio frequency identification tag, prior to being mounted with the integrated components.

With reference to FIG. 12, anchors 127 and 128 include individual component solder attachment pads 127A and 127B and 128A and 128B, respectively. Each of the attachment pads 127A, 127B, 128A, and 128B may be formed using any suitable process from any suitable material, such as metallic foil or conductive ink, as is known, which allows for the use of solder material to attach components to the attachment pads.

Anchors 127 and 128 may be arranged on an upper surface in any suitable manner allowing for the attachment or mounting of any suitable components. More preferably, anchor 127 is operatively retained on the upper surface between conductive trace interconnect segment 122C and conductive trace interconnect segment 122A and between a longitudinal central axis and a first edge. Anchor 128 is operatively retained on the upper surface between conductive trace interconnect segment 124B and conductive trace interconnect segment 124A and between a longitudinal central axis and a second edge. Anchor 128 may have a radio frequency identification assembly or encoded chip 1400, as illustrated in FIG. 13, attached thereto, by any suitable means to provide electrical conduction between the attachment point and the radio frequency identification encoded chip.

Radio frequency identification encoded chip 1400 may be of any suitable size and include an integrated or discrete memory means or device, such as flash memory, to store data, such as a unique identification number, as is known. Radio frequency identification encoded chip may also include an integrated transmitter for broadcasting the data stored in any integrated or discrete memory means or device, as is known. As a result, radio frequency identification encoded chip 1400 may overlie portions of trace interconnect segments 122B, 124A, and 124B without contacting the interconnects.

Figure 13:
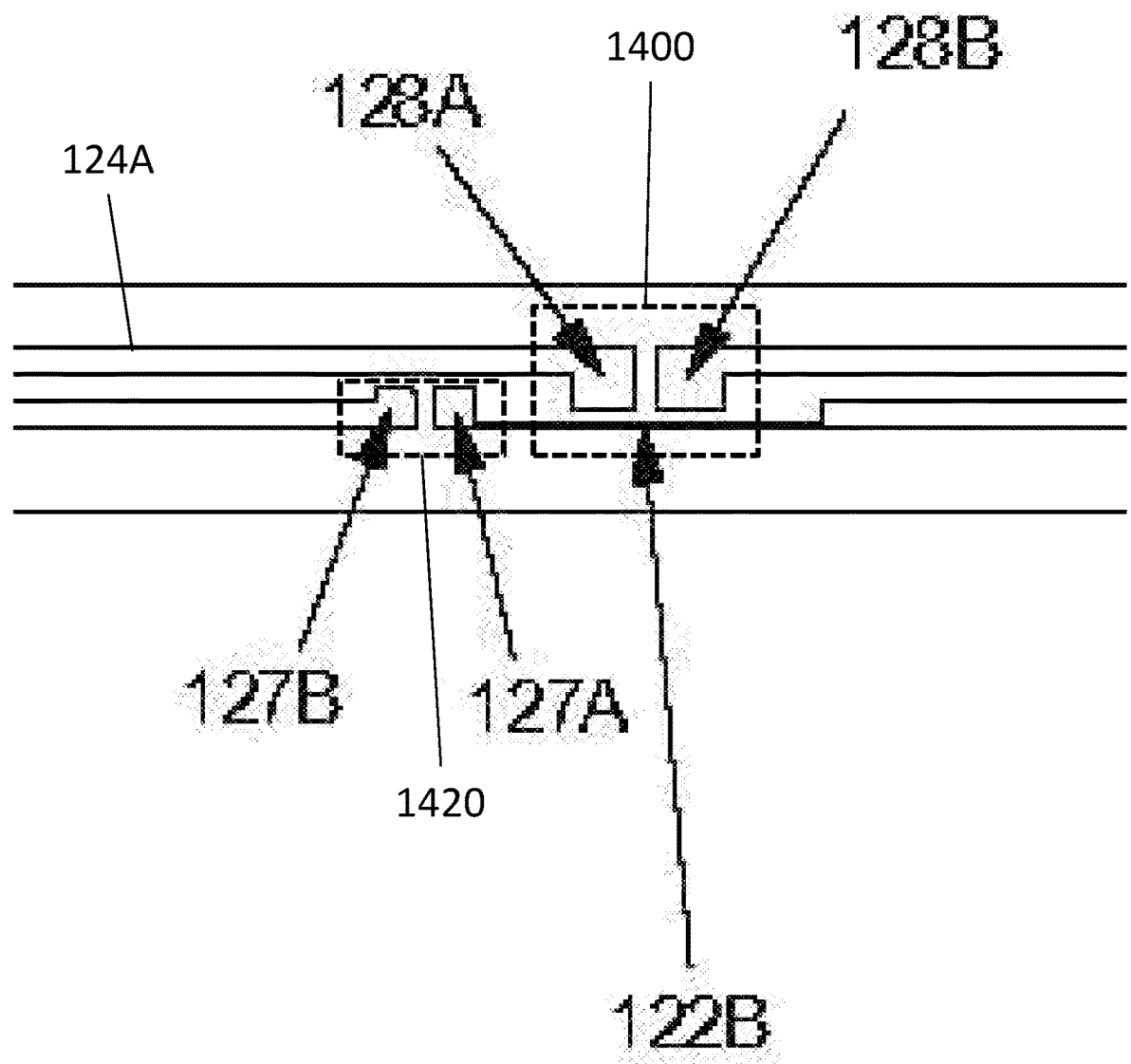
FIG. 13 illustrates the location of a capacitor for the micro radio frequency identification tag of FIG. 12.

Anchor 127 may have a passive component 1420, as illustrated in FIG. 13, similarly attached by any suitable electrically conductive means. Passive component 1420 may be a capacitor, inductor, and/or a resistor. Alternatively, other components, such as discrete memory means or devices, separate power sources, and the like, may be attached to any number of other anchors on either the upper surface or an engagement surface.

Trace interconnect segments 122A, 122C, 124A, and 124B are generally formed using any suitable process from any suitable material, such as metallic foil, conductive ink, wire, or the like, and extend in spaced parallel relation to one another.

Trace interconnect segments 124A and 122C overlie and extend from communication bore 130 and terminate into attachment pads 128A and 127B, respectively, of anchors 128 and 127. Trace interconnect segment 122A extends from communication bore 132 to trace interconnect segment 122B. Trace interconnect segment 122B extends from trace interconnect segment 122A to attachment pad 127A.

As a result, trace interconnect segments 122A and 122C are operatively connected to the passive component 1420 of anchor 127. Trace interconnect segments 124A and 124B overlie and extend from communication bores 130 and 132, respectively, and terminate into attachment pads 128A and 128B, respectively, of anchor 128. As a result, trace interconnect segments 124A and 124B are operatively connected to a radio frequency identification encoded chip.

Communication bores 130 and 132 are each arranged proximate to a respective opposite end of a substrate 1100. Communication bores 130 and 132 may each form a pair of openings on the upper surface and extend through substrate 1100 to the engagement surface.

As illustrated in FIG. 12, trace interconnect segments 122A and 124B are non-continuous in that bore 132 creates a physical break between trace interconnect segments 122A and 124B. Moreover, trace interconnect segments 124A and 122C are non-continuous in that bore 130 creates a physical break between trace interconnect segments 124A and 122C.

Alternatively, communication bores 130 and 132 may form any number of openings or other conductive means, such as wires, a rivet, a plated opening or opening filled with conductive ink, or the like, which may extend partially or completely through substrate 1100.

Figure 14:
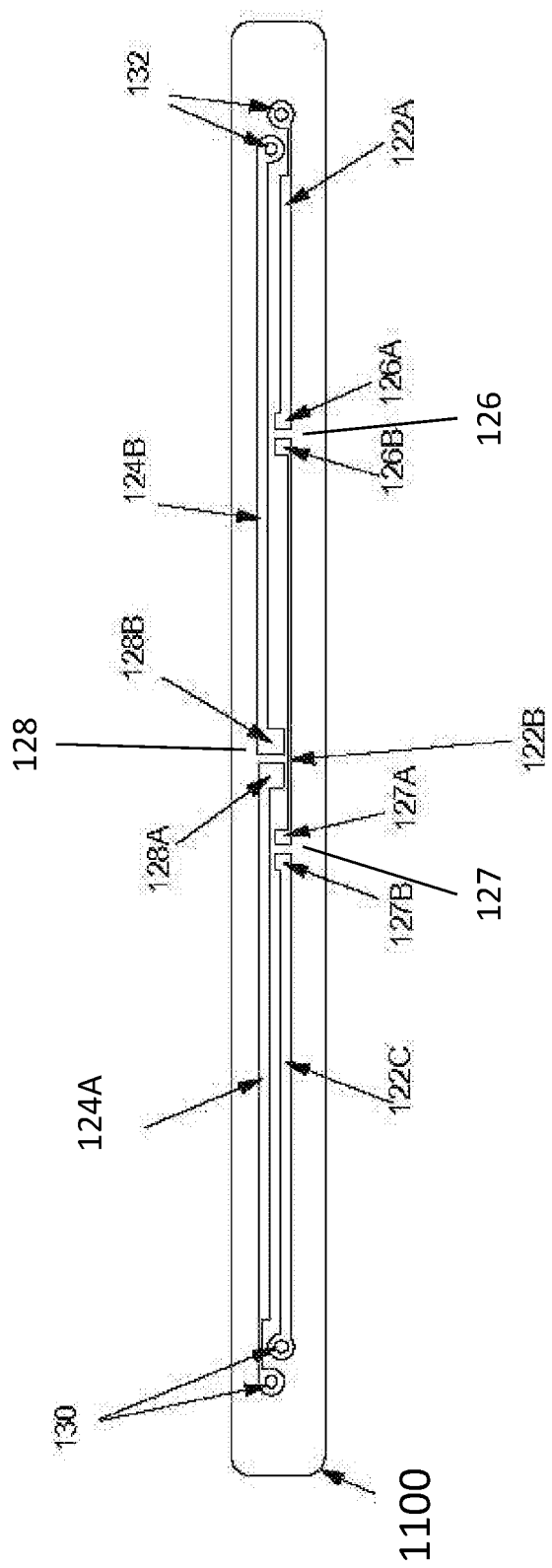
FIG. 14 illustrates a substrate assembly of another embodiment of a micro radio frequency identification tag, prior to being mounted with the integrated components.

With reference to FIG. 14, anchors 126, 127, and 128 include individual component solder attachment pads 126A and 126B; 127A and 127B; 128A and 128B; respectively. Each of the attachment pads 126A, 126B, 127A, 127B, 128A, and 128B may be formed using any suitable process from any suitable material, such as metallic foil or conductive ink, as is known, which allows for the use of solder material to attach components to the attachment pads.

Anchors 126, 127, and 128 may be arranged on an upper surface in any suitable manner allowing for the attachment or mounting of any suitable components.

More preferably, anchor 126 is operatively retained on the upper surface between conductive trace interconnect segment 122B and conductive trace interconnect segment 122A and between a longitudinal central axis and a first edge. Anchor 127 is operatively retained on the upper surface between conductive trace interconnect segment 122C and conductive trace interconnect segment 122B and between a longitudinal central axis and a first edge.

Anchor 128 is operatively retained on the upper surface between conductive trace interconnect segment 124B and conductive trace interconnect segment 124A and between a longitudinal central axis and a second edge. Anchor 128 may have a radio frequency identification assembly or encoded chip 1400, as illustrated in FIG. 15, attached thereto, by any suitable means to provide electrical conduction between the attachment point and the radio frequency identification encoded chip.

Radio frequency identification encoded chip 1400 may be of any suitable size and include an integrated or discrete memory means or device, such as flash memory, to store data, such as a unique identification number, as is known. Radio frequency identification encoded chip may also include an integrated transmitter for broadcasting the data stored in any integrated or discrete memory means or device, as is known. As a result, radio frequency identification encoded chip 1400 may overlie portions of trace interconnect segments 122B, 124A, and 124B without contacting the interconnects.

Figure 15:
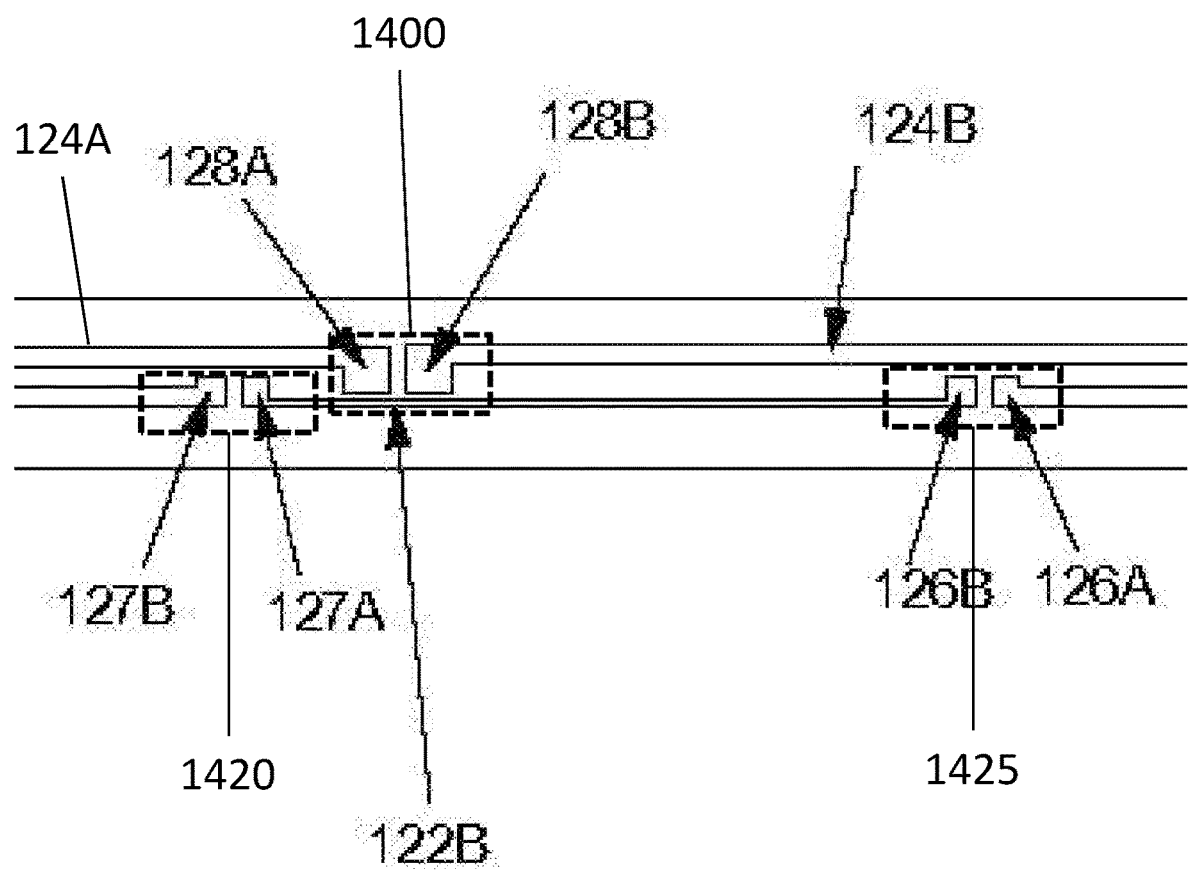
FIG. 15 illustrates the location of capacitors for the micro radio frequency identification tag of FIG. 14.

Anchor 127 may have a passive component 1420, as illustrated in FIG. 15, similarly attached by any suitable electrically conductive means. Passive component 1420 may be a capacitor, inductor, and/or a resistor. Alternatively, other components, such as discrete memory means or devices, separate power sources, and the like, may be attached to any number of other anchors on either the upper surface or an engagement surface.

Anchor 126 may have a passive component 1425, as illustrated in FIG. 15, similarly attached by any suitable electrically conductive means. Passive component 1425 may be a capacitor, inductor, and/or a resistor. Alternatively, other components, such as discrete memory means or devices, separate power sources, and the like, may be attached to any number of other anchors on either the upper surface or an engagement surface.

It is noted that passive component 1420 and passive component 1425 may be the same type of passive component; such as both capacitors; or that passive component 1420 and passive component 1425 may be of different types of passive component; such as one is a capacitor and the other is an inductor.

The location of the passive components 1420 and 1425 is asymmetrical with respect to the location of the anchor 128. In other words, the distance from anchor 126 to anchor 128 is not equal to the distance from anchor 127 to anchor 128.

Trace interconnect segments 122A, 122B, 122C, 124A, and 124B are generally formed using any suitable process from any suitable material, such as metallic foil, conductive ink, wire, or the like, and extend in spaced parallel relation to one another.

Trace interconnect segments 124B and 122A overlie and extend from communication bore 132 and terminate into attachment pads 128B and 126A, respectively, of anchors 128 and 126. Trace interconnect segment 122B extends from attachment pad 126B to attachment pad 127A. Trace interconnect segment 122C extends from attachment pad 127B and terminates at communication bore 130. Trace interconnect segment 124A extends from attachment pad 128A and terminates at communication bore 130.

As a result, trace interconnect segments 122A and 122B are operatively connected to the passive component 1425, as illustrated in FIG. 15, of anchor 126. Trace interconnect segments 122C and 122B are operatively connected to the passive component 1420, as illustrated in FIG. 15, of anchor 127.

It is noted that trace interconnect segments 124A and 124B overlie and extend from communication bores 130, 132, respectively, and terminate into attachment pads 128A and 128B, respectively, of anchor 128. As a result, trace interconnect segments 124A and 124B are operatively connected to a radio frequency identification encoded chip 1400.

Communication bores 130 and 132 are each arranged proximate to a respective opposite end of a substrate 1100. Communication bores 130 and 132 may each form a pair of openings on the upper surface and extend through substrate 1100 to the engagement surface.

As illustrated in FIG. 14, trace interconnect segments 122A and 124B are non-continuous in that bore 132 creates a physical break between trace interconnect segments 122A and 124B. Moreover, trace interconnect segments 124A and 122C are non-continuous in that bore 130 creates a physical break between trace interconnect segments 124A and 122C.

Alternatively, communication bores 130 and 132 may form any number of openings or other conductive means, such as wires, a rivet, a plated opening or opening filled with conductive ink, or the like, which may extend partially or completely through substrate 1100.

Figure 16:
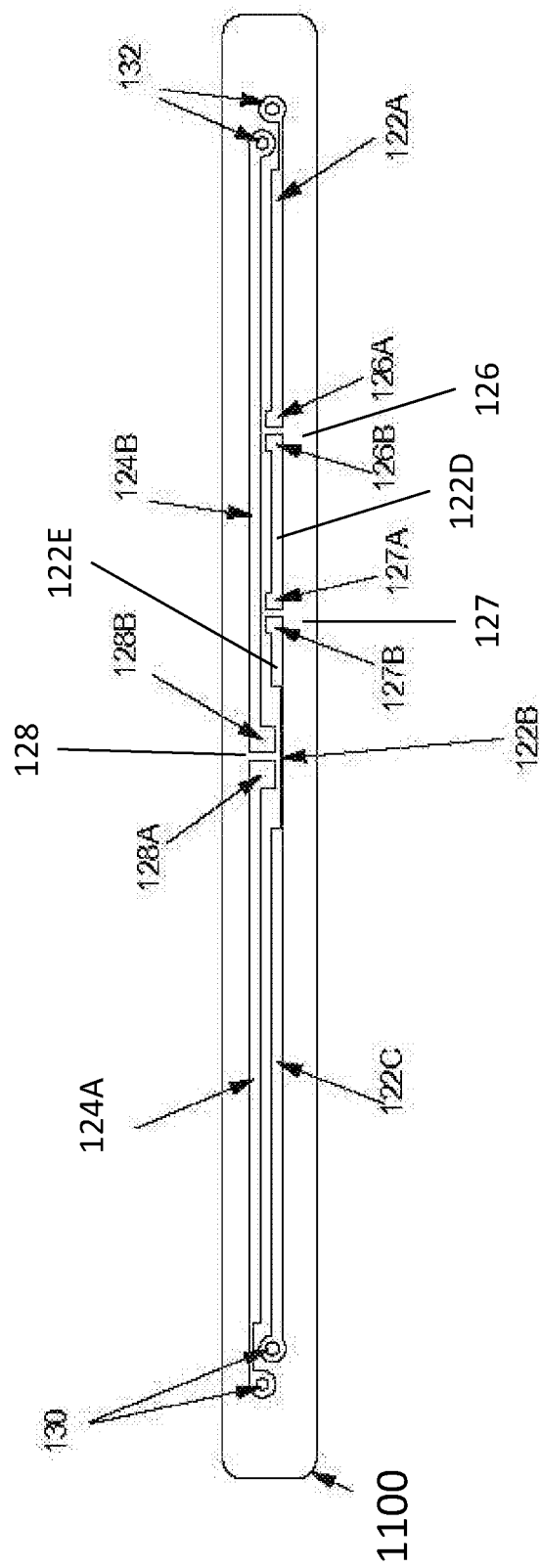
FIG. 16 illustrates a substrate assembly of another embodiment of a micro radio frequency identification tag, prior to being mounted with the integrated components.

With reference to FIG. 16, anchors 126, 127, and 128 include individual component solder attachment pads 126A and 126B; 127A and 127B; 128A and 128B; respectively. Each of the attachment pads 126A, 126B, 127A, 127B, 128A, and 128B may be formed using any suitable process from any suitable material, such as metallic foil or conductive ink, as is known, which allows for the use of solder material to attach components to the attachment pads.

Figure 18:
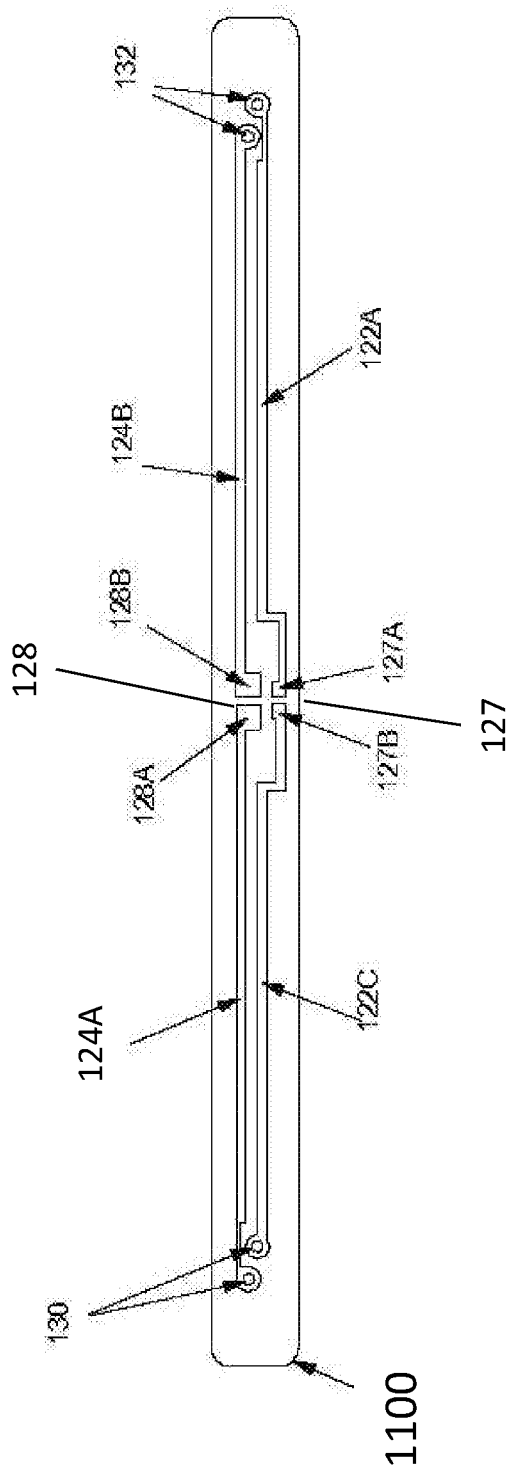
FIG. 18 illustrates a substrate assembly of another embodiment of a micro radio frequency identification tag, prior to being mounted with the integrated components.

Anchors 126, 127, and 128 may be arranged on an upper surface in any suitable manner allowing for the attachment or mounting of any suitable components. As illustrated in FIG. 16, anchors 126 and 127 are located on a same side with respect to anchor 128. In other words, as illustrated in FIG. 18, anchors 126 and 127 are not located between anchor 128 and communication bore 130. Alternatively, anchors 126 and 127 may be located on the opposite side of the anchor 128 such that anchors 126 and 127 are not located between anchor 128 and communication bore 132.

More preferably, anchor 126 is operatively retained on the upper surface between conductive trace interconnect segment 122A and conductive trace interconnect segment 122D and between a longitudinal central axis and a first edge. Anchor 127 is operatively retained on the upper surface between conductive trace interconnect segment 122D and conductive trace interconnect segment 122E and between a longitudinal central axis and a first edge. Conductive trace interconnect segment 122E is connected to bore 130 through conductive trace interconnect segment 122B and conductive trace interconnect segment 122C.

Anchor 128 is operatively retained on the upper surface between conductive trace interconnect segment 124B and conductive trace interconnect segment 124A and between a longitudinal central axis and a second edge. Anchor 128 may have a radio frequency identification assembly or encoded chip 1400, as illustrated in FIG. 17, attached thereto, by any suitable means to provide electrical conduction between the attachment point and the radio frequency identification encoded chip.

Radio frequency identification encoded chip 1400 may be of any suitable size and include an integrated or discrete memory means or device, such as flash memory, to store data, such as a unique identification number, as is known. Radio frequency identification encoded chip may also include an integrated transmitter for broadcasting the data stored in any integrated or discrete memory means or device, as is known.

As a result, radio frequency identification encoded chip 1400 may overlie portions of trace interconnect segments 122B, 124A, and 124B without contacting the interconnects.

Figure 17:
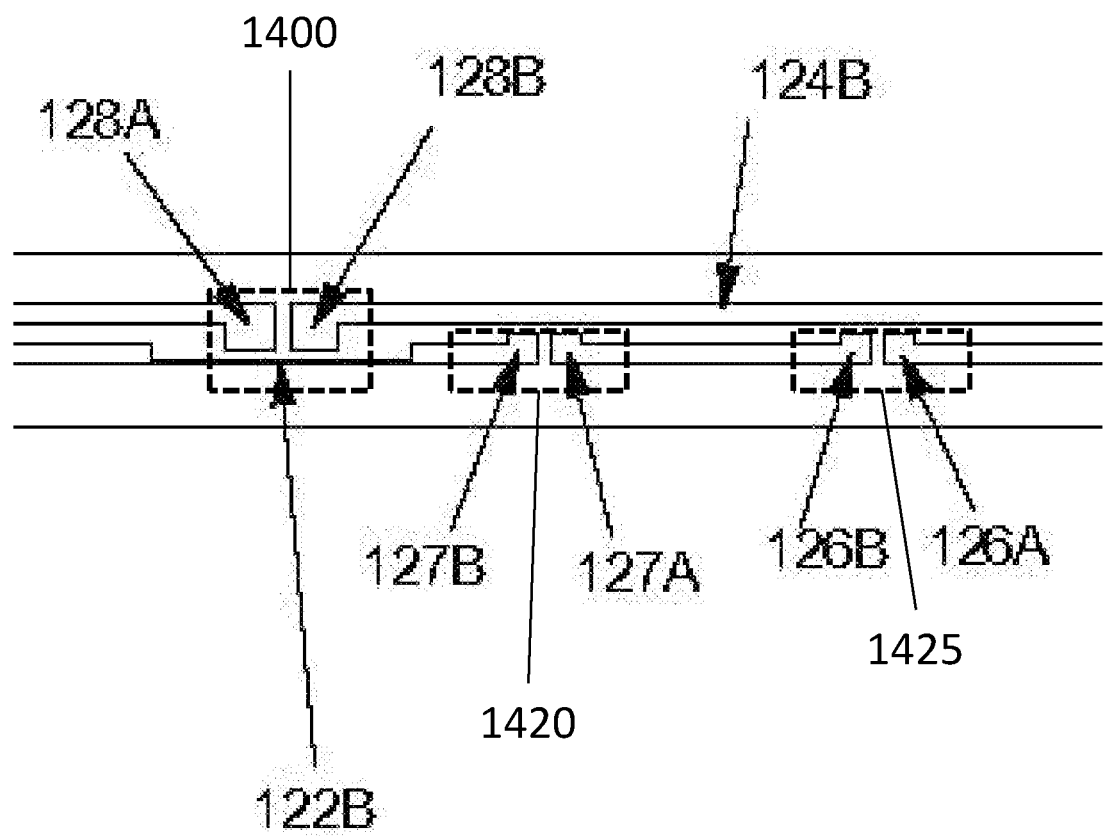
FIG. 17 illustrates the location of capacitors for the micro radio frequency identification tag of FIG. 16.

Anchor 127 may have a passive component 1420, as illustrated in FIG. 17, similarly attached by any suitable electrically conductive means. Passive component 1420 may be a capacitor, inductor, and/or a resistor. Alternatively, other components, such as discrete memory means or devices, separate power sources, and the like, may be attached to any number of other anchors on either the upper surface or an engagement surface.

Anchor 126 may have a passive component 1425, as illustrated in FIG. 17, similarly attached by any suitable electrically conductive means. Passive component 1425 may be a capacitor, inductor, and/or a resistor. Alternatively, other components, such as discrete memory means or devices, separate power sources, and the like, may be attached to any number of other anchors on either the upper surface or an engagement surface.

It is noted that passive component 1420 and passive component 1425 may be the same type of passive component; such as both capacitors; or that passive component 1420 and passive component 1425 may be of different types of passive component; such as one is a capacitor and the other is an inductor.

It is further noted that passive component 1420 and passive component 1425 may be the same type of passive component with the same value; e.g., two capacitors with the same farad value. Also, it is noted that passive component 1420 and passive component 1425 may be the same type of passive component with different values; e.g., two capacitors with different farad values.

The location of the passive components 1420 and 1425 is located on a same side of the anchor 128. In other words, as illustrated in FIG. 17, passive components 1420 and 1425 are not located between anchor 128 and communication bore 130. Alternatively, the passive components 1420 and 1425 may be located on the opposite side of the anchor 128 such that passive components 1420 and 1425 are not located between anchor 128 and communication bore 132.

Trace interconnect segments 122A, 122B, 122C, 122D, 122E, 124A, and 124B are generally formed using any suitable process from any suitable material, such as metallic foil, conductive ink, wire, or the like, and extend in spaced parallel relation to one another.

Trace interconnect segments 124B and 122A overlie and extend from communication bore 132 and terminate into attachment pads 128B and 126A, respectively, of anchors 128 and 126. Trace interconnect segment 122D extends from attachment pad 126B to attachment pad 127A. Trace interconnect segment 122E extends from attachment pad 126B to trace interconnect segment 122B. Trace interconnect segment 122B extends from trace interconnect segment 122E to trace interconnect segment 122C. Trace interconnect segment 122C extends from trace interconnect segment 122B and terminates at communication bore 130. Trace interconnect segment 124A extends from attachment pad 128A and terminates at communication bore 130.

As a result, trace interconnect segments 122A and 122D are operatively connected to the passive component 1425, as illustrated in FIG. 17, of anchor 126. Trace interconnect segments 122D 122E are operatively connected to the passive component 1420, as illustrated in FIG. 17, of anchor 127.

Trace interconnect segments 124A and 124B overlie and extend from communication bores 130 and 132, respectively, and terminate into attachment pads 128A and 128B, respectively, of anchor 128. As a result, trace interconnect segments 124A and 124B are operatively connected to a radio frequency identification encoded chip 1400.

Communication bores 130 and 132 are each arranged proximate to a respective opposite end of a substrate 1100. Communication bores 130 and 132 may each form a pair of openings on the upper surface and extend through substrate 1100 to the engagement surface.

As illustrated in FIG. 16, trace interconnect segments 122A and 124B are non-continuous in that bore 132 creates a physical break between trace interconnect segments 122A and 124B. Moreover, trace interconnect segments 124A and 122C are non-continuous in that bore 130 creates a physical break between trace interconnect segments 124A and 122C.

Alternatively, communication bores 130 and 132 may form any number of openings or other conductive means, such as wires, a rivet, a plated opening or opening filled with conductive ink, or the like, which may extend partially or completely through substrate 1100.

With reference to FIG. 18, anchors 127 and 128 include individual component solder attachment pads 127A and 127B; and 128A and 128B; respectively. Each of the attachment pads 127A, 127B, 128A, and 128B may be formed using any suitable process from any suitable material, such as metallic foil or conductive ink, as is known, which allows for the use of solder material to attach components to the attachment pads.

Anchors 127 and 128 may be arranged on an upper surface in any suitable manner allowing for the attachment or mounting of any suitable components. More preferably, anchor 127 is operatively retained on the upper surface between conductive trace interconnect segment 122C and conductive trace interconnect segment 122A and between a longitudinal central axis and a first edge.

Anchor 128 is operatively retained on the upper surface between conductive trace interconnect segment 124B and conductive trace interconnect segment 124A and between a longitudinal central axis and a second edge.

As illustrated in FIG. 18, anchors 127 and 128 are equidistant from bore 130. Moreover, anchors 127 and 128 are equidistant from bore 132.

Figure 19:
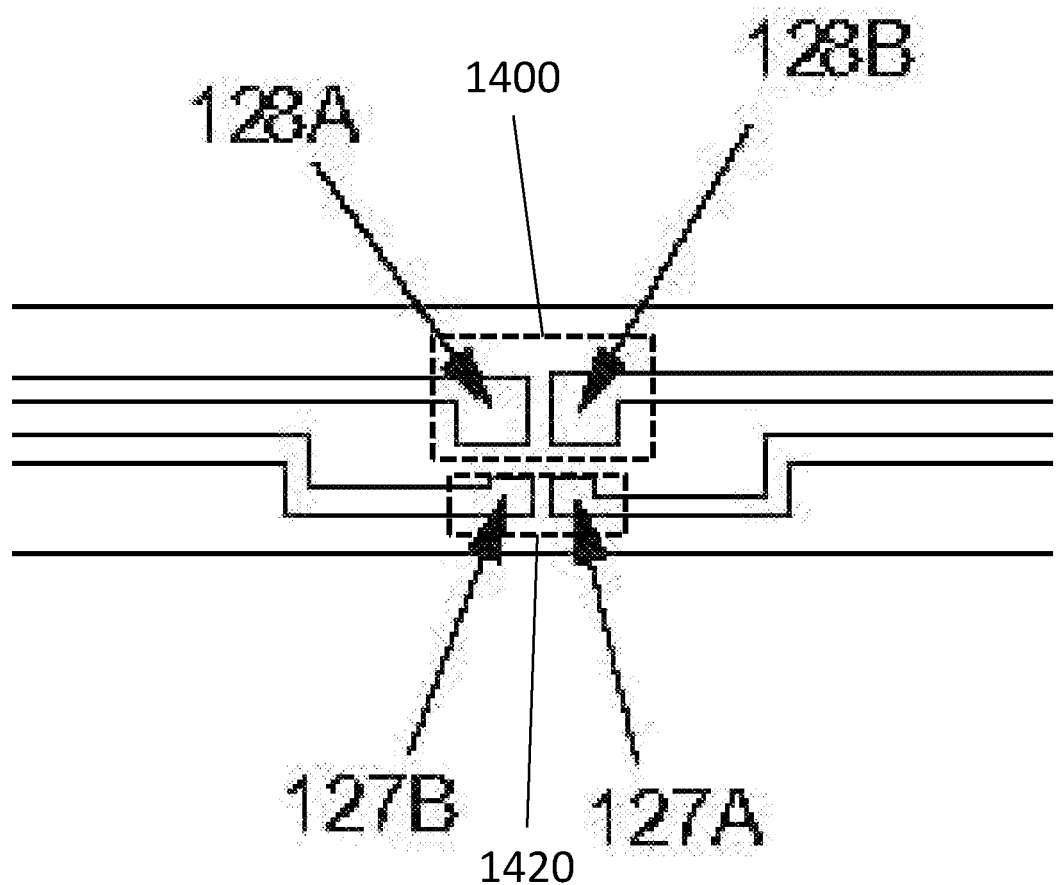
FIG. 19 illustrates the location of a capacitor for the micro radio frequency identification tag of FIG. 18.

Anchor 128 may have a radio frequency identification assembly or encoded chip 1400, as illustrated in FIG. 19, attached thereto, by any suitable means to provide electrical conduction between the attachment point and the radio frequency identification encoded chip.

Radio frequency identification encoded chip 1400 may be of any suitable size and include an integrated or discrete memory means or device, such as flash memory, to store data, such as a unique identification number, as is known. Radio frequency identification encoded chip may also include an integrated transmitter for broadcasting the data stored in any integrated or discrete memory means or device, as is known. Radio frequency identification encoded chip 1400 may overlie portions of trace interconnect segments 124A, 124B, 122B, and 122A without contacting the interconnects.

Anchor 127 may have a passive component 1420, as illustrated in FIG. 19, similarly attached by any suitable electrically conductive means. Passive component 1420 may be a capacitor, inductor, and/or a resistor. Alternatively, other components, such as discrete memory means or devices, separate power sources, and the like, may be attached to any number of other anchors on either the upper surface or an engagement surface.

Based upon the configuration illustrated in FIG. 18, radio frequency identification encoded chip 1400 and passive component 1420 are equidistant from bore 130. Moreover, based upon the configuration illustrated in FIG. 18, radio frequency identification encoded chip 1400 and passive component 1420 are equidistant from bore 132.

Trace interconnect segments 122A, 122C, 124A, and 124B are generally formed using any suitable process from any suitable material, such as metallic foil, conductive ink, wire, or the like, and extend in spaced parallel relation to one another.

Trace interconnect segments 124A and 122C overlie and extend from communication bore 130 and terminate into attachment pads 128A and 127B, respectively, of anchors 128 and 127. Trace interconnect segment 122A extends from attachment pad 127A and terminates at communication bore 132.

As a result, trace interconnect segments 122A and 122C are operatively connected to the passive component 1420 of anchor 127. Trace interconnect segments 124A and 124B overlie and extend from communication bores 130 and 132, respectively, and terminate into attachment pads 128A and 128B, respectively, of anchor 128. As a result, trace interconnect segments 124A and 124B are operatively connected to a radio frequency identification encoded chip.

Communication bores 130 and 132 are each arranged proximate to a respective opposite end of a substrate 1100. Communication bores 130 and 132 may each form a pair of openings on the upper surface and extend through substrate 1100 to the engagement surface.

As illustrated in FIG. 18, trace interconnect segments 122A and 124B are non-continuous in that bore 132 creates a physical break between trace interconnect segments 122A and 124B. Moreover, trace interconnect segments 124A and 122C are non-continuous in that bore 130 creates a physical break between trace interconnect segments 124A and 122C.

Alternatively, communication bores 130 and 132 may form any number of openings or other conductive means, such as wires, a rivet, a plated opening or opening filled with conductive ink, or the like, which may extend partially or completely through substrate 1100.

Figure 20:
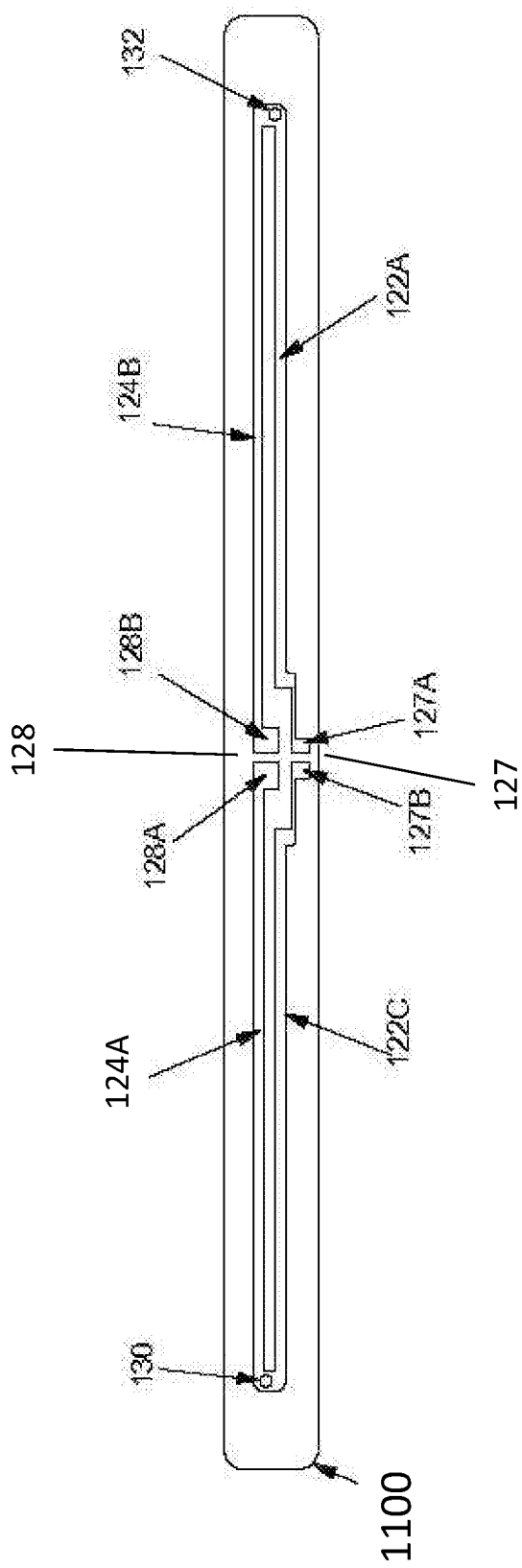
FIG. 20 illustrates a substrate assembly of another embodiment of a micro radio frequency identification tag, prior to being mounted with the integrated components.

With reference to FIG. 20, anchors 127 and 128 include individual component solder attachment pads 127A and 127B; and 128A and 128B; respectively. Each of the attachment pads 127A, 127B, 128A, and 128B may be formed using any suitable process from any suitable material, such as metallic foil or conductive ink, as is known, which allows for the use of solder material to attach components to the attachment pads.

Anchors 127 and 128 may be arranged on an upper surface in any suitable manner allowing for the attachment or mounting of any suitable components. More preferably, anchor 127 is operatively retained on the upper surface between conductive trace interconnect segment 122C and conductive trace interconnect segment 122A and between a longitudinal central axis and a first edge.

As illustrated in FIG. 20, anchors 127 and 128 are equidistant from bore 130. Moreover, anchors 127 and 128 are equidistant from bore 132.

Additionally, as illustrated in FIG. 20, trace interconnect segments 122A and 124B form a continuous trace interconnect segment such that bore 132 does not create a physical break between trace interconnect segments 122A and 124B.

Moreover, as illustrated in FIG. 20, trace interconnect segments 124A and 122C form a continuous trace interconnect segment such that bore 130 does not create a physical break between trace interconnect segments 124A and 122C.

Anchor 128 is operatively retained on the upper surface between conductive trace interconnect segment 124B and conductive trace interconnect segment 124A and between a longitudinal central axis and a second edge. Anchor 128 may have a radio frequency identification assembly or encoded chip 1400, as illustrated in FIG. 21, attached thereto, by any suitable means to provide electrical conduction between the attachment point and the radio frequency identification encoded chip.

Radio frequency identification encoded chip 1400 may be of any suitable size and include an integrated or discrete memory means or device, such as flash memory, to store data, such as a unique identification number, as is known. Radio frequency identification encoded chip may also include an integrated transmitter for broadcasting the data stored in any integrated or discrete memory means or device, as is known. Radio frequency identification encoded chip 1400 may overlie portions of trace interconnect segments 124A, 124B, 122B, and 122A without contacting the interconnects.

Figure 21:
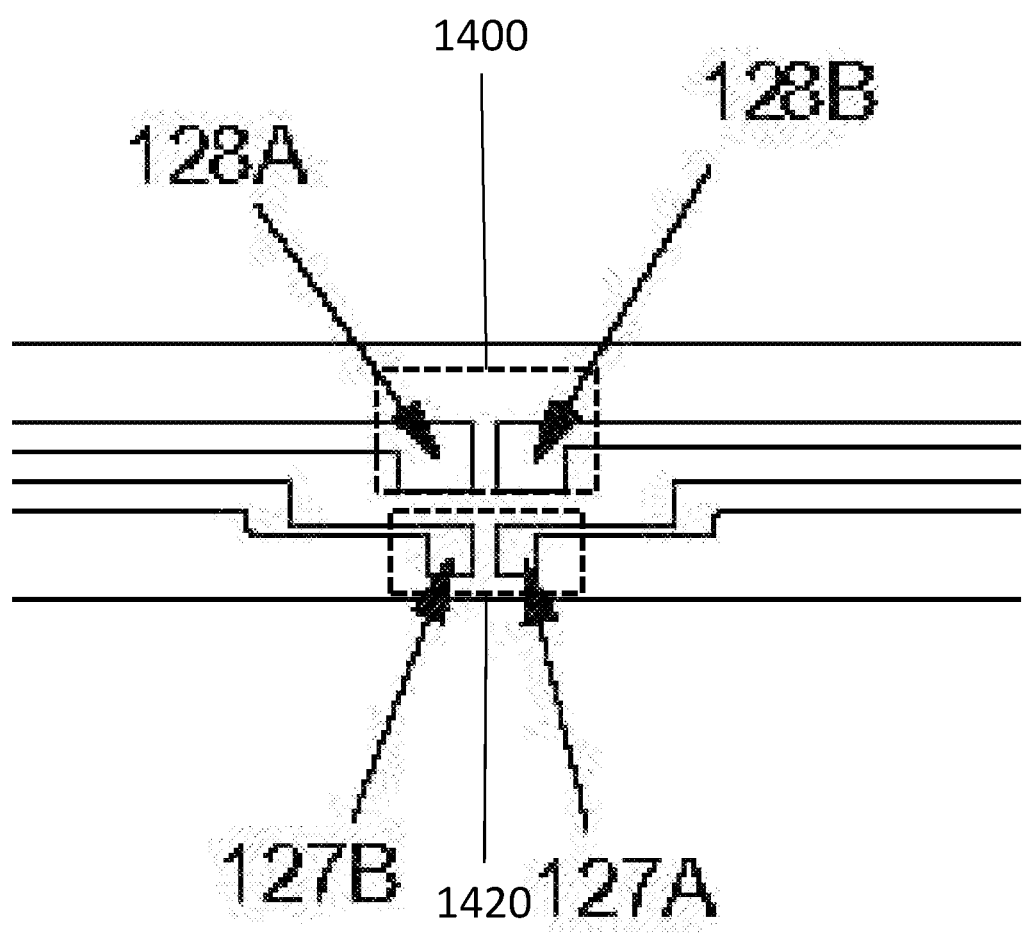
FIG. 21 illustrates the location of a capacitor for the micro radio frequency identification tag of FIG. 20.

Anchor 127 may have a passive component 1420, as illustrated in FIG. 21, similarly attached by any suitable electrically conductive means. Passive component 1420 may be a capacitor, inductor, and/or a resistor. Alternatively, other components, such as discrete memory means or devices, separate power sources, and the like, may be attached to any number of other anchors on either the upper surface or an engagement surface.

Based upon the configuration illustrated in FIG. 20, radio frequency identification encoded chip 1400 and passive component 1420 are equidistant from bore 130. Moreover, based upon the configuration illustrated in FIG. 20, radio frequency identification encoded chip 1400 and passive component 1420 are equidistant from bore 132.

Trace interconnect segments 122A, 122C, 124A, and 124B are generally formed using any suitable process from any suitable material, such as metallic foil, conductive ink, wire, or the like, and extend in spaced parallel relation to one another.

Trace interconnect segments 124A and 122C overlie and extend from communication bore 130 and terminate into attachment pads 128A and 127B, respectively, of anchors 128 and 127. Trace interconnect segment 122A extends from attachment pad 127A and terminates at communication bore 132. As a result, trace interconnect segments 122A and 122C are operatively connected to and bridges between the passive component 1420 of anchor 127. Trace interconnect segments 124A and 124B overlie and extend from communication bores 130 and 132, respectively, and terminate into attachment pads 128A and 128B, respectively, of anchor 128. As a result, trace interconnect segments 124A and 124B are operatively connected to a radio frequency identification encoded chip.

Communication bores 130 and 132 are each arranged proximate to a respective opposite end of a substrate 1100. Communication bores 130 and 132 may each form a pair of openings on the upper surface and extend through substrate 1100 to the engagement surface.

Alternatively, communication bores 130 and 132 may form any number of openings or other conductive means, such as wires, a rivet, a plated opening or opening filled with conductive ink, or the like, which may extend partially or completely through substrate 1100.

A micro radio frequency identification tag for use on an article, the micro radio frequency identification tag comprises a substrate having a first surface and a second surface, each surface including a width and a longitudinal length, the longitudinal length being greater than the width; a chip anchor having a first chip attachment pad and a second chip attachment pad; a radio frequency identification chip operatively retained on the first surface by the chip anchor; a component anchor having a first component attachment pad and a second component attachment pad; a passive component operatively retained on the first surface by the component anchor; a continuous planar antenna operatively retained on the second surface; a first conductive trace interconnect segment connected to the continuous planar antenna and the first chip attachment pad; a second conductive trace interconnect segment connected to the continuous planar antenna and the second chip attachment pad; a third conductive trace interconnect segment connected to the continuous planar antenna and the first component attachment pad; a fourth conductive trace interconnect segment connected to the continuous planar antenna and the second component attachment pad.

The third conductive trace interconnect segment may have a length greater than a length of the fourth conductive trace interconnect segment.

The third conductive trace interconnect segment may have a length equal to a length of the fourth conductive trace interconnect segment.

The passive component may be a capacitor, an inductor, or a resistor.

A micro radio frequency identification tag for use on an article, the micro radio frequency identification tag comprises a substrate having a first surface and a second surface, each surface including a width and a longitudinal length, the longitudinal length being greater than the width; a chip anchor having a first chip attachment pad and a second chip attachment pad; a radio frequency identification chip operatively retained on the first surface by the chip anchor; a first component anchor having a first component attachment pad and a second component attachment pad; a second component anchor having a third component attachment pad and a fourth component attachment pad; a first passive component operatively retained on the first surface by the first component anchor; a second passive component operatively retained on the first surface by the second component anchor; a continuous planar antenna operatively retained on the second surface; a first conductive trace interconnect segment connected to the continuous planar antenna and the first chip attachment pad; a second conductive trace interconnect segment connected to the continuous planar antenna and the second chip attachment pad; a third conductive trace interconnect segment connected to the continuous planar antenna and the first component attachment pad; a fourth conductive trace interconnect segment connected to the continuous planar antenna and the fourth component attachment pad; the third conductive trace interconnect segment having a length not equal to a length of the fourth conductive trace interconnect segment.

The micro radio frequency identification tag may further comprise a fifth conductive trace interconnect segment connected to the second component attachment pad and the third component attachment pad.

The length of the third conductive trace interconnect segment may be greater than the length of the fourth conductive trace interconnect segment.

The first conductive trace interconnect segment may have a length less than the length of the third conductive trace interconnect segment and the second conductive trace interconnect segment may have a length less than the length of the third conductive trace interconnect segment.

The first conductive trace interconnect segment may have a length greater than the length of the fourth conductive trace interconnect segment and the second conductive trace interconnect segment may have a length greater than the length of the fourth conductive trace interconnect segment.

The first passive component may be a capacitor, an inductor, or a resistor.

The second passive component may be a capacitor, an inductor, or a resistor.

It will be appreciated that variations of the above-disclosed embodiments and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above.

What is claimed is:

1. A micro radio frequency identification tag for use on an article, the micro radio frequency identification tag comprising:
    a substrate having a first surface and a second surface, each surface including a width and a longitudinal length, said longitudinal length being greater than said width;
    a chip anchor having a first chip attachment pad and a second chip attachment pad;
    a radio frequency identification chip operatively retained on said first surface by said chip anchor;
    a component anchor having a first component attachment pad and a second component attachment pad;
    a passive component operatively retained on said first surface by said component anchor;
    a continuous planar antenna operatively retained on said second surface;
    a first conductive trace interconnect segment connected to said continuous planar antenna and said first chip attachment pad;
    a second conductive trace interconnect segment connected to said continuous planar antenna and said second chip attachment pad;
    a third conductive trace interconnect segment connected to said continuous planar antenna and said first component attachment pad;
    a fourth conductive trace interconnect segment connected to said continuous planar antenna and said second component attachment pad.

2. The micro radio frequency identification tag, as claimed in claim 1, wherein said third conductive trace interconnect segment has a length greater than a length of said fourth conductive trace interconnect segment.

3. The micro radio frequency identification tag, as claimed in claim 1, wherein said third conductive trace interconnect segment has a length equal to a length of said fourth conductive trace interconnect segment.

4. The micro radio frequency identification tag, as claimed in claim 1, wherein said passive component is a capacitor.

5. The micro radio frequency identification tag, as claimed in claim 1, wherein said passive component is an inductor.

6. The micro radio frequency identification tag, as claimed in claim 1, wherein said passive component is a resistor.

7. A micro radio frequency identification tag for use on an article, the micro radio frequency identification tag comprising:
- a substrate having a first surface and a second surface, each surface including a width and a longitudinal length, said longitudinal length being greater than said width;
- a chip anchor having a first chip attachment pad and a second chip attachment pad;
- a radio frequency identification chip operatively retained on said first surface by said chip anchor;
- a first component anchor having a first component attachment pad and a second component attachment pad;
- a second component anchor having a third component attachment pad and a fourth component attachment pad;
- a first passive component operatively retained on said first surface by said first component anchor;
- a second passive component operatively retained on said first surface by said second component anchor;
- a continuous planar antenna operatively retained on said second surface;
- a first conductive trace interconnect segment connected to said continuous planar antenna and said first chip attachment pad;
- a second conductive trace interconnect segment connected to said continuous planar antenna and said second chip attachment pad;
- a third conductive trace interconnect segment connected to said continuous planar antenna and said first component attachment pad;
- a fourth conductive trace interconnect segment connected to said continuous planar antenna and said fourth component attachment pad;
- said third conductive trace interconnect segment having a length not equal to a length of said fourth conductive trace interconnect segment.

8. The micro radio frequency identification tag, as claimed in claim 7, further comprising:
- a fifth conductive trace interconnect segment connected to said second component attachment pad and said third component attachment pad.

9. The micro radio frequency identification tag, as claimed in claim 7, wherein the length of said third conductive trace interconnect segment is greater than the length of said fourth conductive trace interconnect segment.

10. The micro radio frequency identification tag, as claimed in claim 7, wherein said first conductive trace interconnect segment has a length less than the length of said third conductive trace interconnect segment and said second conductive trace interconnect segment has a length less than the length of said third conductive trace interconnect segment.

11. The micro radio frequency identification tag, as claimed in claim 7, wherein said first conductive trace interconnect segment has a length greater than the length of said fourth conductive trace interconnect segment and said second conductive trace interconnect segment has a length greater than the length of said fourth conductive trace interconnect segment.

12. The micro radio frequency identification tag, as claimed in claim 7, wherein said first passive component is a capacitor.

13. The micro radio frequency identification tag, as claimed in claim 12, wherein said second passive component is a capacitor.

14. The micro radio frequency identification tag, as claimed in claim 12, wherein said second passive component is an inductor.

15. The micro radio frequency identification tag, as claimed in claim 12, wherein said second passive component is a resistor.

16. The micro radio frequency identification tag, as claimed in claim 7, wherein said first passive component is an inductor.

17. The micro radio frequency identification tag, as claimed in claim 7, wherein said first passive component is a resistor.

18. The micro radio frequency identification tag, as claimed in claim 7, wherein said second passive component is a capacitor.

19. The micro radio frequency identification tag, as claimed in claim 7, wherein said second passive component is an inductor.

20. The micro radio frequency identification tag, as claimed in claim 7, wherein said second passive component is a resistor.

* * * * *